(12) United States Patent
Kubo

(10) Patent No.: US 11,068,107 B2
(45) Date of Patent: Jul. 20, 2021

(54) DISPLAY DEVICE AND DISPLAY METHOD

(71) Applicant: Japan Display Inc., Tokyo (JP)

(72) Inventor: Masaki Kubo, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/819,378

(22) Filed: Mar. 16, 2020

(65) Prior Publication Data

US 2020/0301559 A1   Sep. 24, 2020

(30) Foreign Application Priority Data

Mar. 18, 2019   (JP) .............................. JP2019-050510

(51) Int. Cl.
  *G06F 3/041*   (2006.01)
  *G06F 3/044*   (2006.01)

(52) U.S. Cl.
  CPC .......... *G06F 3/04184* (2019.05); *G06F 3/044* (2013.01)

(58) Field of Classification Search
  CPC ............... G06F 3/0412; G06F 3/04166; G06F 3/04184; G06F 3/044; G06F 3/0445; G06F 3/0446
  See application file for complete search history.

(56) References Cited

U.S. PATENT DOCUMENTS

| 2004/0135761 | A1* | 7/2004 | Cheng ................. | G09G 3/3685 345/100 |
| 2010/0321305 | A1* | 12/2010 | Chang .................. | G06F 3/0446 345/173 |
| 2012/0050217 | A1* | 3/2012 | Noguchi ............. | G06F 3/04184 345/174 |
| 2014/0152617 | A1* | 6/2014 | Kida ..................... | G06F 3/0446 345/174 |
| 2015/0277657 | A1* | 10/2015 | Azumi ................. | G09G 3/3648 345/174 |
| 2018/0095575 | A1 | 4/2018 | Ota et al. | |

FOREIGN PATENT DOCUMENTS

JP   2018-060319 A   4/2018

* cited by examiner

*Primary Examiner* — Mihir K Rayan
(74) *Attorney, Agent, or Firm* — K&L Gates LLP

(57) ABSTRACT

A display device comprising: a plurality of pixel electrodes supplied with a pixel signal and a display functional layer configured to perform a display operation based on the pixel signal; a plurality of touch detection electrodes configured to output a touch detection signal and perform a touch detection operation; and a controller configured to control the display operation and the touch detection operation.

17 Claims, 14 Drawing Sheets

PRESENT EMBODIMENT

FIG.15 FIRST MODIFICATION

DISPLAY DEVICE AND DISPLAY METHOD

CROSS-REFERENCE TO RELATED APPLICATIONS

This application claims priority from Japanese Application No. 2019-050510, filed on Mar. 18, 2019, the contents of which are incorporated by reference herein in its entirety.

BACKGROUND

1. Technical Field

The present disclosure relates to a display device and a display method.

2. Description of the Related Art

Touch detection devices capable of detecting an external proximity object, what are called touch panels, have recently been attracting attention. Touch panels are mounted on or integrated with display devices, such as liquid crystal display devices, and used as display devices with a touch detection function. Display devices with a touch detection function display various kinds of button images and the like on the display device, thereby enabling a user to input information using the touch panel instead of typical mechanical buttons. Japanese Patent Application Laid-open Publication No. 2018-60319 discloses a display device with a touch detecting function that performs a display operation of a display panel and a touch detection operation of a touch panel in a time-division manner in a frame period for displaying one frame of the display panel.

If one frame period includes a plurality of display periods for displaying images and a plurality of touch detection periods for performing touch detection, the conventional techniques have a problem in improving the touch detection accuracy.

SUMMARY

A display device according to one embodiment of the present disclosure includes a plurality of pixel electrodes supplied with a pixel signal and a display functional layer configured to perform a display operation based on the pixel signal, a plurality of touch detection electrodes configured to output a touch detection signal and perform a touch detection operation, and a controller configured to control the display operation and the touch detection operation. The controller causes the display operation and the touch detection operation to be performed such that a frame period is divided into a first period and a second period, the first period including a first display period for performing the display operation for a partial image in an image of one frame, a first touch detection period for performing touch detection on one detection surface, and a blank period coming before the first display period and the first touch detection period and for performing neither the display operation nor the touch detection operation, the second period including a second display period for performing the display operation for another partial image in the image of one frame and a second touch detection period for performing touch detection on one detection surface, and the controller makes the length of the first display period different from the length of the second display period.

A display method according to one embodiment of the present disclosure performed by a display device including a plurality of pixel electrodes supplied with a pixel signal, a display functional layer configured to perform a display operation based on the pixel signal, and a plurality of touch detection electrodes configured to output a touch detection signal and perform a touch detection operation is disclosed. The display method includes causing the display operation and the touch detection operation to be performed such that a frame period is divided into a first period and a second period, the first period including a first display period for performing the display operation for a partial image in an image of one frame, a first touch detection period for performing touch detection on one detection surface, and a blank period coming before the first display period and the first touch detection period and for performing neither the display operation nor the touch detection operation, the second period including a second display period for performing the display operation for another partial image in the image of one frame and a second touch detection period for performing touch detection on one detection surface, and making the length of the first display period different from the length of the second display period.

DETAILED DESCRIPTION

Figure 1:
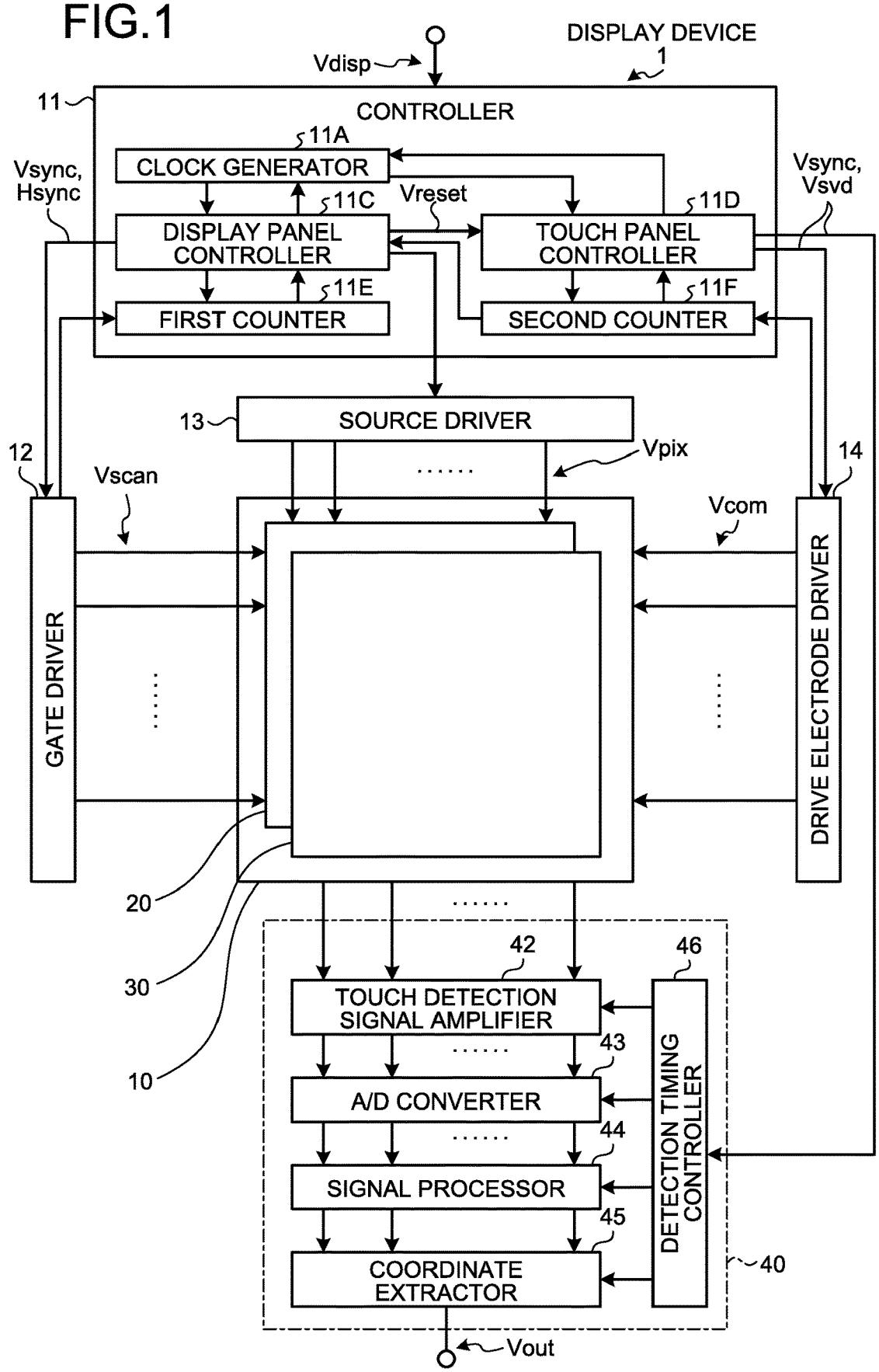
FIG. 1 is a block diagram of an exemplary configuration of a display device according to an embodiment of the present disclosure.

Exemplary embodiments according to the present disclosure are described below with reference to the accompanying drawings. What is disclosed herein is given by way of example only, and appropriate changes made without departing from the spirit of the disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the disclosure. In the present specification and the figures, components similar to those previously described with reference to previous figures are denoted by like reference numerals, and detailed explanation thereof may be appropriately omitted.

Configuration of the Display Device

FIG. 1 is a block diagram of an exemplary configuration of a display device according to an embodiment of the present disclosure. As illustrated in FIG. 1, a display device 1 according to the present embodiment includes a display unit 10, a controller 11, a gate driver 12, a source driver 13, a drive electrode driver 14, and a touch detector 40. In the display device 1, the display unit 10 incorporates a touch detection function. The display unit 10 is a device that integrates a display panel 20 and a touch panel 30. The display panel 20 includes liquid crystal display elements serving as display elements. The touch panel 30 serves as a touch detection device that detects touch input. The display unit 10 may be what is called an on-cell device with the touch panel 30 mounted on the display panel 20. The display panel 20 may be an organic electroluminescence (EL) display panel, for example.

The display panel 20 is a display device that performs display by sequentially scanning horizontal lines one by one based on scanning signals Vscan supplied from the gate driver 12, which will be described later.

The controller 11 controls a display operation for displaying images performed by the display panel 20 and a touch detection operation performed by the touch panel 30. The controller 11 is a circuit that supplies controls signals to the gate driver 12, the source driver 13, the drive electrode driver 14, and the touch detector 40 based on video signals Vdisp supplied from outside. The controller 11 performs control such that these components operate synchronously or asynchronously with one another. The controller 11 includes a display panel controller 11C and a touch panel controller 11D. The display panel controller 11C mainly controls the display operation of the display panel 20, and the touch panel controller 11D mainly controls the touch detection operation of the touch panel 30. The controller 11 may be a central processing unit (CPU) that performs control described later.

The gate driver 12 has a function of sequentially selecting one horizontal line to be an object of display drive in the display unit 10 based on the control signals (vertical synchronization signals Vsync and horizontal synchronization signals Hsync) supplied from the display panel controller 11C of the controller 11.

The source driver 13 is a circuit that supplies pixel signals Vpix to sub-pixels SPix, which will be described later, of the display unit 10 based on the control signals and the pixel signals Vpix supplied from the display panel controller 11C of the controller 11.

The drive electrode driver 14 is a circuit that supplies drive signals Vcom to drive electrodes Tx, which will be described later, of the display unit 10 based on the control signals (vertical synchronization signals Vsync and touch detection synchronization signals Vsvd) supplied from the touch panel controller 11D of the controller 11.

The touch panel 30 operates based on a basic principle of capacitance touch detection and detects contact or proximity of an external conductor. If the touch panel 30 detects contact or proximity of an external conductor, the touch panel 30 outputs touch detection signals Vdet.

The touch detector 40 is a circuit that determines whether a touch is made on the touch panel 30 based on the control signals supplied from the touch panel controller 11D of the controller 11 and on the touch detection signals Vdet supplied from the touch panel 30. If a touch is detected, the touch detector 40 calculates the coordinates at which the touch input is performed, for example. The touch detector 40 includes a touch detection signal amplifier 42, an analog/digital (A/D) converter 43, a signal processor 44, a coordinate extractor 45, and a detection timing controller 46.

Figure 2:
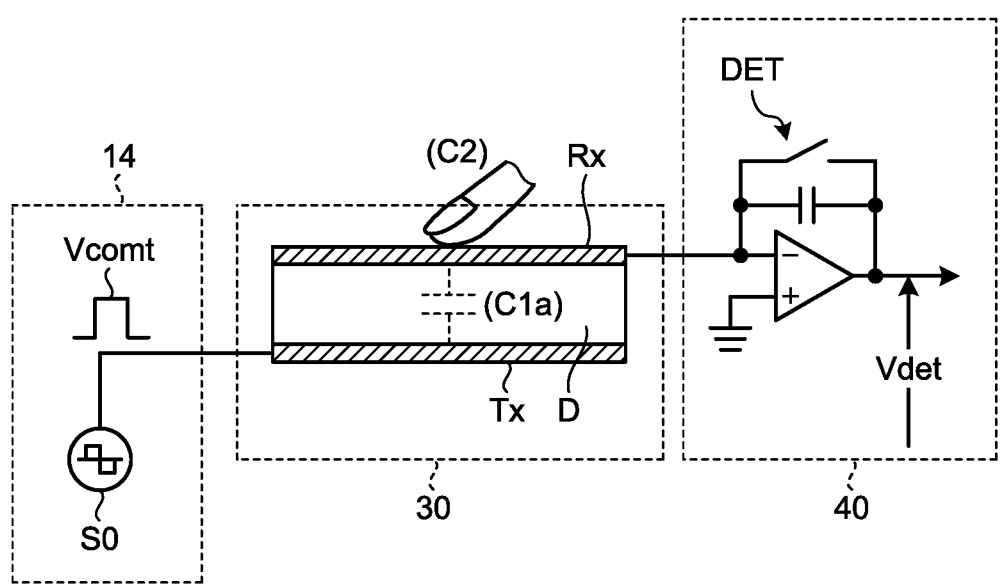
FIG. 2 is a diagram for explaining an operation of a touch panel.

As described above, the touch panel 30 operates based on the basic principle of capacitance touch detection. The following describes the basic principle of a capacitance touch detection system of the display device 1 according to the present embodiment with reference to FIG. 2. FIG. 2 is a diagram for explaining an operation of the touch panel. The touch panel 30 is a capacitance touch sensor and includes a drive electrode Tx and a touch detection electrode Rx. The drive electrode Tx and the touch detection electrode Rx are disposed facing each other with a dielectric D interposed therebetween to form a capacitance element C1. The drive electrode Tx is supplied with touch drive signals Vcomt from the drive electrode driver 14. The touch drive signal Vcomt is an alternating-current (AC) rectangular wave at a predetermined frequency (e.g., a frequency of the order of several kilohertz to several hundred kilohertz). The touch detection electrode Rx is coupled to the touch detector 40. The touch detector 40 includes a voltage detector DET. The voltage detector DET, for example, is an integration circuit included in the touch detection signal amplifier 42 of the touch detector 40, which will be described later. The voltage detector DET converts fluctuations in the electric current depending on the touch drive signal Vcomt into fluctuations in the voltage. The touch detector 40 determines contact or proximity of an object to be detected (e.g., a finger or a stylus) based on fluctuations caused by a capacitance element C2 formed by the object to be detected.

To accurately detect a difference |ΔV| indicating a variation of voltage with respect to a reference voltage, the voltage detector DET preferably operates having a period Reset for releasing electric charges accumulated in a capacitor based on the frequency of the touch drive signals Vcomt by a switching element. The reference voltage indicates the value of voltage output from the voltage detector DET before being affected by the fluctuations caused by the object to be detected.

The A/D converter 43 of the touch detector 40 samples analog signals of the difference |ΔV| output from the touch detection signal amplifier 42 at an appropriate timing, thereby converting the analog signals into digital signals. The signal processor 44 of the touch detector 40, which will be described later, performs an arithmetic operation for averaging the data (digital signals) of the difference |ΔV| output from the A/D converter 43, thereby calculating the average of the difference |ΔV|, for example. With this operation, the signal processor 44 can reduce the effects of noise on the difference |ΔV|. The signal processor 44 compares the calculated average of the difference |ΔV| with a predetermined threshold Vth. If the average is substantially equal to or higher than the threshold Vth, the signal processor 44 determines that the object to be detected touches (is in proximity to) the touch panel 30. If the average is lower than the threshold Vth, the signal processor 44 determines that the object to be detected does not touch (is not in proximity to) the touch panel 30. In the following description, detecting a touch means determining, by the touch detector 40, that an object to be detected touches (is in proximity to) the touch panel 30 as described above. In other words, detecting a touch may include determining both that an object to be detected touches the touch panel 30 and that it is in proximity to the touch panel 30.

The coordinate extractor 45 of the touch detector 40 is a logic circuit that calculates, when the signal processor 44 detects a touch, the touch panel coordinates of the touch. The detection timing controller 46 performs control such that the touch detection signal amplifier 42, the A/D converter 43, the signal processor 44, and the coordinate extractor 45 operate in synchronization with one another. The coordinate extractor 45 outputs the touch panel coordinates as detection signal output Vout. The touch detector 40 does not necessarily include the signal processor 44 or the coordinate extractor 45. In this case, the touch detector 40 may output the output signals from the A/D converter 43 as the detection signal output Vout. As described above, the touch detector 40 can perform touch detection. Instead of the mutual capacitance detection system, in which the touch detection electrode Rx facing the drive electrode Tx detects the AC drive signals supplied to the drive electrode Tx, the capacitance touch sensor may employ a self-capacitance detection system, for example. The self-capacitance detection system detects an object to be detected by supplying AC signals to the detection electrode and detecting the degree of fluctuations in the detection electrode.

Figure 3:
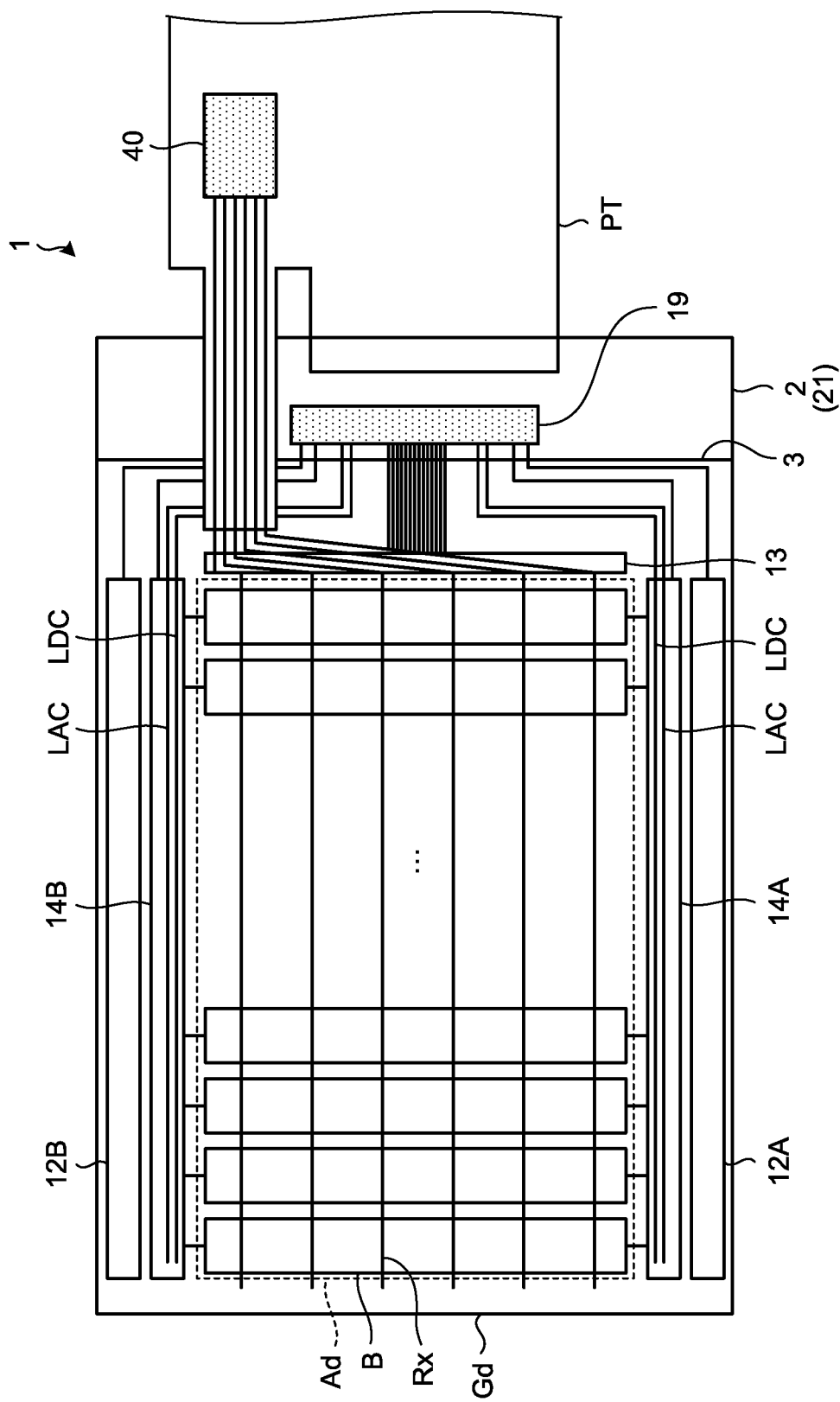
FIG. 3 is a schematic of an example of a module provided with the display device according to the present embodiment.

FIG. 3 is a schematic of an example of a module provided with the display device according to the present embodiment. As illustrated in FIG. 3, the display device 1 includes a pixel substrate 2 (first substrate 21), which will be described later, and a printed circuit board PT. The printed circuit board PT is a flexible printed circuit board, for example. The pixel substrate 2 (first substrate 21) is provided with a chip on glass (COG) 19 and has a display region Ad of the display panel 20 and a frame Gd. The COG 19 is a chip of an integrated circuit (IC) driver mounted on the first substrate 21 and is a control device including circuits required for a display operation and serving as the controller 11 illustrated in FIG. 1. The source driver 13 according to the present embodiment is provided on the first substrate 21. Alternatively, the source driver 13 may be incorporated in the COG 19. Drive electrode scanners 14A and 14B, which are part of the drive electrode driver 14, are provided to the first substrate 21. The gate driver 12 is also provided to the first substrate 21 as gate drivers 12A and 12B. The display device 1 may incorporate circuits, such as the drive electrode scanners 14A and 14B and the gate driver 12, in the COG 19. The COG 19 is given by way of example of a mounting form, and the embodiment is not limited thereto. A component having the same functions as the COG 19 may be provided as a chip on film or a chip on flexible (COF), for example.

As illustrated in FIG. 3, drive electrode blocks B of the drive electrodes Tx intersect the touch detection electrodes Rx when viewed in a direction perpendicular to the surface of the first substrate 21.

The drive electrodes Tx are divided into a plurality of stripe electrode patterns extending in one direction. To perform a touch detection operation, the drive electrode driver 14 sequentially supplies the drive signals Vcom to the electrode patterns. The drive electrode block B illustrated in FIG. 3 corresponds to a plurality of stripe electrode patterns of the drive electrodes Tx simultaneously supplied with the drive signals Vcom. The drive electrode blocks B (drive electrodes Tx) are disposed side by side in the long-side direction of the display unit 10. The touch detection electrodes Rx, which will be described later, extend in a direction intersecting the extension direction of the drive electrode blocks B. The touch detection electrodes Rx are disposed side by side in the short-side direction of the display unit 10, for example. The output of the touch detection electrodes Rx is provided on the side closer to the printed circuit board PT of the display unit 10. The output is coupled to the touch detector 40 mounted on the printed circuit board PT via the printed circuit board PT. As described above, the touch detector 40 is mounted on the printed circuit board PT and is coupled to the touch detection electrodes Rx disposed side by side. The printed circuit board PT is not limited to a flexible printed circuit board and may be a rigid or rigid-flexible circuit board. The touch detector 40 is not necessarily mounted on the printed circuit board PT and may be provided on a control circuit board provided outside the module and coupled via the printed circuit board PT. While the touch detector 40 according to the present embodiment is a touch driver IC mounted on the printed circuit board PT, part of the functions of the touch detector 40 may be provided as functions of another microprocessing unit (MPU). Specifically, part of functions (e.g., noise reduction) out of various functions that can be provided as the functions of the touch driver IC, such as A/D conversion and noise reduction, may be performed by a circuit, such as an MPU, provided independently of the touch driver IC. The touch detector 40 may be incorporated in the COG 19 (one-chip configuration). In this case, the detection signals may be transmitted to the COG 19 on an array substrate via wiring of the printed circuit board PT, for example.

The source driver 13 is provided near the display region Ad on the first substrate 21. The display region Ad includes a number of sub-pixels SPix, which will be described later, disposed in a matrix (row-column configuration). The frame Gd is a region formed outside the display region Ad and including no sub-pixel SPix viewed in the direction perpendicular to the surface of the first substrate 21. The gate driver 12 and the drive electrode scanners 14A and 14B of the drive electrode driver 14 are disposed in the frame Gd.

The gate driver 12 includes the gate drivers 12A and 12B, for example. The gate driver 12 is composed of TFT elements and provided on the first substrate 21. The gate drivers 12A and 12B sandwich the display region Ad including the sub-pixels SPix (pixels), which will be described later, disposed in a matrix (row-column configuration) and can drive them from both sides. Scanning lines are disposed between the gate drivers 12A and 12B. Specifically, the scanning lines extend in a direction parallel to the extension direction of the drive electrodes COML viewed in the direction perpendicular to the surface of the first substrate 21. While the present embodiment includes two circuits as the gate drivers 12A and 12B, this is given by way of example of a specific configuration of the gate driver 12, and the embodiment is not limited thereto. The gate driver 12 may be one circuit provided at only one end of the scanning lines, for example.

The drive electrode scanners 14A and 14B are composed of TFT elements and provided on the first substrate 21. In a display period, the drive electrode scanners 14A and 14B are supplied with display drive signals Vcomd for driving common electrodes (drive electrodes Tx in touch detection) via display wiring LDC from a drive signal generator. In a touch detection period, the drive electrode scanners 14A and 14B are supplied with touch detection drive signals Vcomt via touch wiring LAC. The drive electrode scanners 14A and 14B can drive, from both sides, the drive electrode blocks B disposed side by side. The display wiring LDC that supplies the display drive signals Vcomd and the touch wiring LAC that supplies the touch drive signals Vcomt are disposed in parallel in the frame Gd. The display wiring LDC is disposed closer to the display region Ad than the touch wiring LAC. With this configuration, the display drive signals Vcomd supplied by the display wiring LDC stabilize the potential state at the ends of the display region Ad. This configuration stabilizes display especially in a liquid crystal display device including lateral electric-field mode liquid crystals. While the present embodiment includes two circuits as the drive electrode scanners 14A and 14B, it may include only one of them.

The display device 1 illustrated in FIG. 3 is coupled to the printed circuit board PT in the extension direction of the touch detection electrodes Rx. This configuration facilitates routing of the wiring to couple the display device 1 to the touch detector 40 via the printed circuit board PT serving as a terminal.

Figure 4:
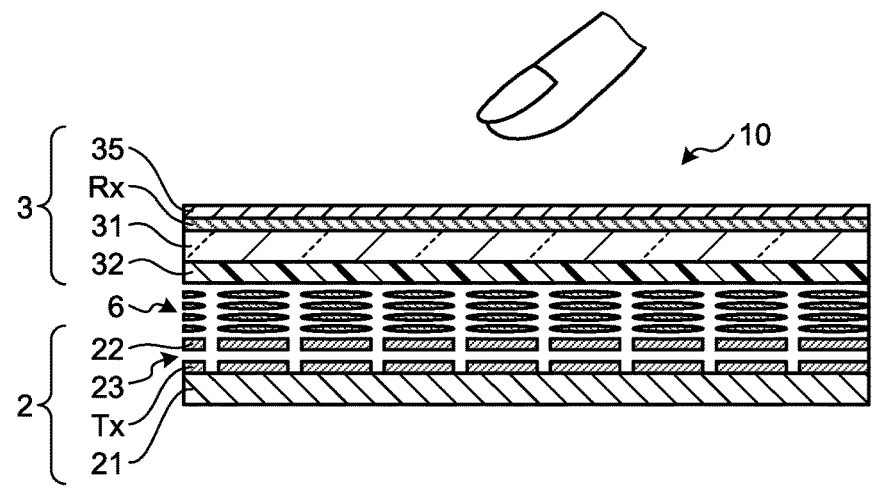
FIG. 4 is a sectional view of a schematic sectional structure of the display device according to the present embodiment.

The following describes an exemplary configuration of the display unit 10 in greater detail. FIG. 4 is a sectional view of a schematic sectional structure of the display device according to the present embodiment. As illustrated in FIG. 4, the display unit 10 includes the pixel substrate 2, a counter substrate 3, and a display functional layer (e.g., a liquid crystal layer 6). The counter substrate 3 is disposed facing the pixel substrate 2 in the direction perpendicular to the surface of the pixel substrate 2. The liquid crystal layer 6 is interposed between the pixel substrate 2 and the counter substrate 3.

The pixel substrate 2 includes the first substrate 21, a plurality of pixel electrodes (second electrodes) 22, a plurality of drive electrodes (first electrodes) Tx, and an insulating layer 23. The first substrate 21 serves as a circuit board. The pixel electrodes 22 are disposed in a matrix (row-column configuration) on the first substrate 21. The drive electrodes Tx are provided between the first substrate 21 and the pixel electrodes 22. The insulating layer 23 insulates the pixel electrodes 22 from the drive electrodes Tx. The first substrate is provided with thin-film transistors (TFTs). A polarizing plate (not illustrated) may be provided under the first substrate 21 with an adhesive layer interposed therebetween.

While the drive electrodes Tx, the insulating layer 23, and the pixel electrodes 22 according to the present embodiment are layered in this order on the first substrate 21, the embodiment is not limited thereto. The pixel electrodes 22, the insulating layer 23, and the drive electrodes Tx may be layered in this order on the first substrate 21. Alternatively, the pixel electrodes 22 and the drive electrodes Tx may be provided in the same layer with an insulating layer interposed therebetween. At least one of the pixel electrodes 22 and the drive electrodes Tx may be disposed on a second substrate 31.

The counter substrate 3 includes a second substrate 31 and a color filter 32 provided on one surface of the second substrate 31. The counter substrate 3 also includes the touch detection electrodes Rx serving as detection electrodes of the touch panel 30 and provided on the other surface of the second substrate 31. A polarizing plate 35 is provided on the touch detection electrodes Rx with an adhesive layer interposed therebetween. The color filter 32 may be disposed on the first substrate 21. The first substrate 21 and the second substrate 31 are glass substrates, for example.

The liquid crystal layer 6 is provided between the first substrate 21 and the second substrate 31. The liquid crystal layer 6 modulates light passing therethrough depending on the state of an electric field. The liquid crystal layer 6, for example, is a display panel including liquid crystals in a lateral electric-field mode, such as the in-plane switching (IPS) mode including the fringe field switching (FFS) mode. An orientation film may be provided between the liquid crystal layer 6 and the pixel substrate 2 and between the liquid crystal layer 6 and the counter substrate 3 illustrated in FIG. 6.

An illuminator, which is not illustrated, is provided under the first substrate 21. The illuminator includes a light source, such as light emitting diodes (LEDs), and outputs light from the light source to the first substrate 21. The light from the illuminator passes through the pixel substrate 2. By switching the parts that block and do not output the light and the parts that output the light depending on the state of liquid crystals at the positions, an image is displayed on the display surface. If the display device 1 is a reflective liquid crystal display device including reflective electrodes that reflect light incident from the second substrate 31 and serve as the pixel electrodes 22 and including translucent drive electrodes Tx in the counter substrate 3, no illuminator needs to be provided under the first substrate 21. The reflective liquid crystal display device may include a front light above the second substrate 31. In this case, light incident from the second substrate 31 side is reflected by the reflective electrodes (pixel electrodes 22), passes through the second substrate 31, and reaches the eyes of an observer. If the display panel 20 is an organic EL display panel, the sub-pixels SPix each include a light emitter. In this case, no illuminator needs to be provided because an image is displayed by controlling the amount of light from the light emitters.

Figure 5:
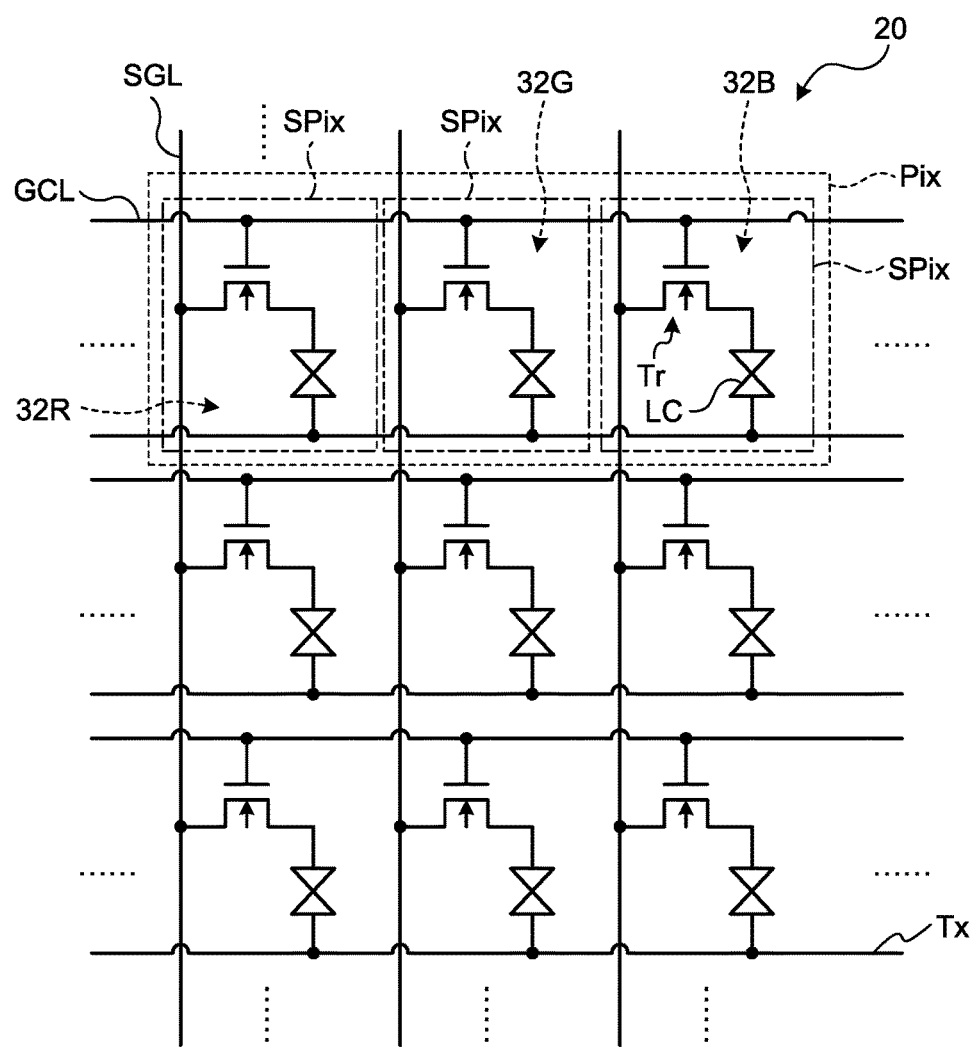
FIG. 5 is a circuit diagram of a pixel array of a display unit according to the present embodiment.

FIG. 5 is a circuit diagram of a pixel array of the display unit according to the present embodiment. The first substrate 21 illustrated in FIG. 4 is provided with thin-film transistor elements (hereinafter, referred to as TFT elements) Tr of the respective sub-pixels SPix and wiring, such as pixel signal lines SGL and scanning lines GCL, as illustrated in FIG. 5. The pixel signal lines SGL supply the pixel signals Vpix to the pixel electrodes 22, and the scanning lines GCL drive the TFT elements Tr. The pixel signal lines SGL and the scanning lines GCL extend on a plane parallel to the surface of the first substrate 21.

The display panel 20 illustrated in FIG. 5 includes a plurality of sub-pixels SPix arrayed in a matrix (row-column configuration). The sub-pixels SPix each include the TFT element Tr and a liquid crystal element LC. The TFT element Tr is a thin-film transistor and is an n-channel metal oxide semiconductor (MOS) TFT in this example. One of the source and the drain of the TFT element Tr is coupled to the pixel signal line SGL, the gate thereof is coupled to the scanning line GCL, and the other of the source and the drain thereof is coupled to a first end of the liquid crystal element LC. The first end of the liquid crystal element LC is coupled to the other of the source and the drain of the TFT element Tr, and a second end thereof is coupled to the drive electrode Tx.

The sub-pixel SPix is coupled to the other sub-pixels SPix belonging to the same row in the display panel 20 by the scanning line GCL. The scanning lines GCL are coupled to the gate driver 12 (refer to FIG. 1) and supplied with the scanning signals Vscan from the gate driver 12. The sub-pixel SPix is coupled to the other sub-pixels SPix belonging to the same column in the display panel 20 by the pixel signal line SGL. The pixel signal lines SGL are coupled to the source driver 13 (refer to FIG. 1) and supplied with the pixel signals Vpix from the source driver 13. The sub-pixel SPix is also coupled to the other sub-pixels SPix belonging to the same row by the drive electrode Tx. The drive electrodes Tx are coupled to the drive electrode driver 14 (refer to FIG. 1) and supplied with the drive signals Vcom from the drive electrode driver 14. In other words, a plurality of sub-pixels SPix belonging to the same row share one drive electrode Tx in this example. The extension direction of the drive electrodes Tx according to the present embodiment is parallel to that of the scanning lines GCL.

While the extension direction of the drive electrodes Tx according to the present embodiment is parallel to that of the scanning lines GCL, the embodiment is not limited thereto. The extension direction of the drive electrodes Tx may be parallel to that of the pixel signal lines SGL. In this case, a plurality of sub-pixels SPix belonging to the same column share one drive electrode Tx, and the drive electrode driver 14 is disposed at one of the ends in the extension direction of the pixel signal lines SGL on the display panel.

The gate driver 12 illustrated in FIG. 1 drives to sequentially scan the scanning lines GCL. The gate driver 12 applies the scanning signals Vscan (refer to FIG. 1) to the gates of the TFT elements Tr of the sub-pixels SPix via the scanning line GCL, thereby sequentially selecting one horizontal line out of the sub-pixels SPix as an object of display drive. The source driver 13 of the display device 1 supplies the pixel signals Vpix to the sub-pixels SPix belonging to one horizontal line, thereby performing display of the horizontal lines one by one. To perform the display operation, the drive electrode driver 14 applies the drive signals Vcom (display drive signals Vcomd) to the drive electrode Tx corresponding to at least the horizontal line. The drive electrode driver 14 may apply the drive signals Vcom (display drive signals Vcomd) to a plurality or all of the drive electrodes Tx including the drive electrodes Tx corresponding to the horizontal line supplied with the scanning signals Vscan.

The color filter 32 illustrated in FIG. 4 includes periodically arrayed color areas 32R, 32G, and 32B in three colors of red (R), green (G), and blue (B), respectively, for example. The color areas 32R, 32G, and 32B in the three colors of R, G, and B serve as a set and are allocated to the respective sub-pixels SPix illustrated in FIG. 5. The set of the color areas 32R, 32G, and 32B serves as one pixel Pix. As illustrated in FIG. 4, the color filter 32 faces the liquid crystal layer 6 in the direction perpendicular to the first substrate 21. The color filter 32 may be a combination of other colors as long as they are colored in different colors. The color filter 32 is not limited to a combination of three colors and may be a combination of four or more colors. The display unit 10 does not necessarily have the color filter 32 and may perform monochrome display.

Figure 6:
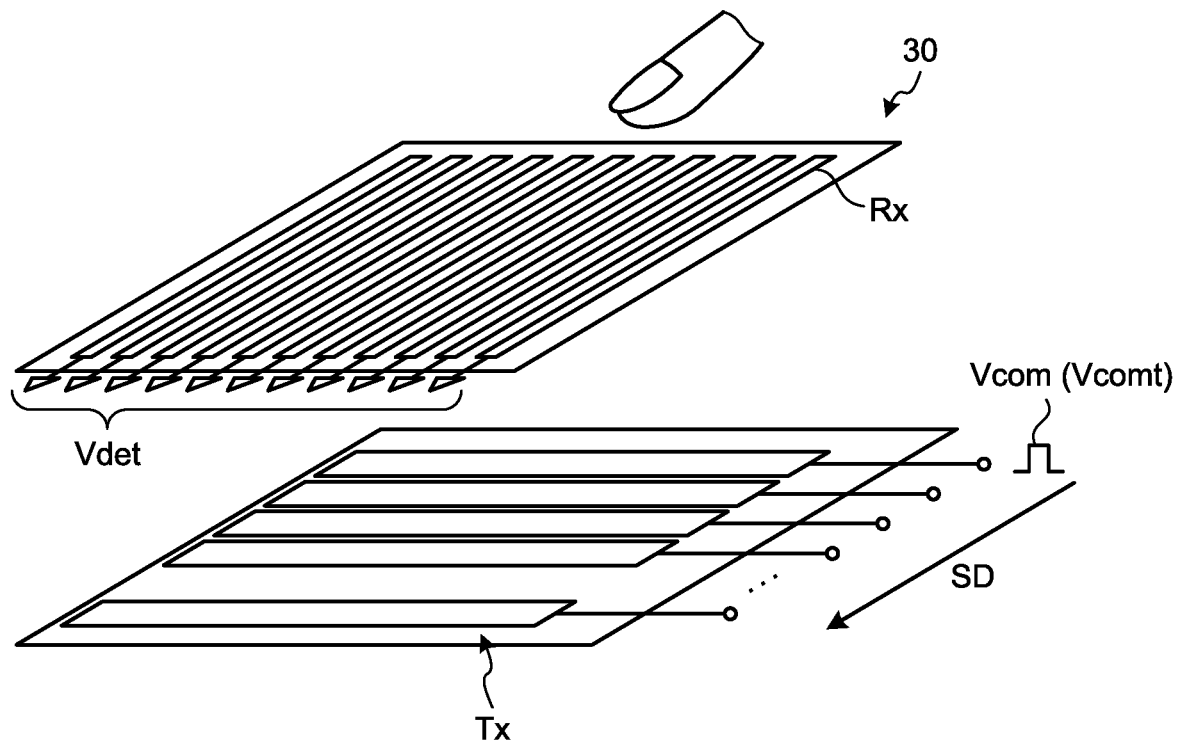
FIG. 6 is a perspective view of an exemplary configuration of drive electrodes and touch detection electrodes in the display unit according to the present embodiment.

The drive electrodes Tx illustrated in FIGS. 4 and 5 function as the common electrodes that apply a common potential to a plurality of sub-pixels SPix in the display panel 20 and as the drive electrodes for touch detection in the touch panel 30. FIG. 6 is a perspective view of an exemplary configuration of the drive electrodes and the touch detection electrodes in the display unit according to the present embodiment. The touch panel 30 includes the drive electrodes Tx provided to the pixel substrate 2 and the touch detection electrodes Rx provided to the counter substrate 3.

The drive electrodes Tx are divided into a plurality of stripe electrode patterns extending in the horizontal direction in FIG. 6. The touch detection electrodes Rx have a plurality of electrode patterns extending in a direction intersecting the extension direction of the electrode patterns of the drive electrodes Tx. The touch detection electrodes Rx face the drive electrodes Tx in the direction perpendicular to the surface of the first substrate 21 (refer to FIG. 4). The electrode patterns of the touch detection electrodes Rx are coupled to respective input terminals of the touch detection signal amplifier 42 of the touch detector 40 (refer to FIG. 1). The intersecting electrode patterns of the drive electrodes Tx and the touch detection electrodes Rx have capacitance at the intersections.

The touch detection electrodes Rx and the drive electrodes Tx are made of a translucent conductive material, such as indium tin oxide (ITO). The electrodes constituting the touch detection electrodes Rx may be made of a metal conductive material. In this case, the touch detection electrodes Rx may be made of a metal material including at least one of aluminum (Al), copper (Cu), silver (Ag), molybdenum (Mo), and an alloy of these metals. The touch detection electrodes Rx may have a multilayered structure including a plurality of layers made of one or more of these metal materials. If the touch detection electrodes Rx are made of a metal conductive material, they are preferably subjected to invisualization processing, such as mesh processing and plating with a black material. The touch detection electrodes Rx and the drive electrodes Tx do not necessarily have a shape divided into a plurality of stripe patterns. The touch detection electrodes Rx and the drive electrodes Tx may have a comb shape, for example. The touch detection electrodes Rx and the drive electrodes Tx simply need to be divided into a plurality of pieces. The shape of slits that divide the drive electrodes Tx may be a straight or curved line.

With this structure, to perform a touch detection operation in the touch panel 30, the drive electrode driver 14 drives to sequentially scan the drive electrodes Tx in a time-division manner, thereby sequentially selecting one detection block of the drive electrodes Tx. The drive electrode driver 14 sequentially supplies the drive signals Vcom (touch drive signals Vcomt) to the selected detection block of the drive electrodes Tx in a scanning direction SD, thereby sequentially performing scanning drive. The touch detection electrodes Rx output the touch detection signals Vdet, thereby performing touch detection on one detection block. The detection block of the drive electrodes Tx includes electrode patterns of one or a plurality of drive electrodes Tx. The detection blocks extend in the direction along the extension direction of the drive electrodes Tx and are disposed side by side in the scanning direction SD.

As illustrated in FIG. 6, the touch detection electrodes Rx and the drive electrodes Tx intersecting each other in the touch panel 30 serve as a capacitance touch sensor formed in a matrix (row-column configuration). With this configuration, the display device 1 performs scanning over the entire touch detection surface of the touch panel 30, thereby detecting the position where an external conductor is in contact with or in proximity to the touch detection surface.

Method for Driving the Display Device

The following describes a method for driving the display device 1. The display panel 20 sequentially scans the horizontal lines of adjacent scanning lines GCL of the (h−1)-th, h-th, and (h+1)-th rows out of the scanning lines GCL one by one based on the scanning signals Vscan supplied from the gate driver 12, thereby performing display. In the same manner, the drive electrode driver 14 supplies the drive signals Vcom to adjacent drive electrodes Tx of the (i−1)-th, i-th, and (i+1)-th columns out of the drive electrodes Tx in the display unit 10 based on the control signals supplied from the controller 11. In the following description, the drive signal Vcom serving as a display drive signal is referred to as the display drive signal Vcomd, whereas the drive signal Vcom serving as a touch drive signal is referred to as the touch drive signal Vcomt.

Figure 7:
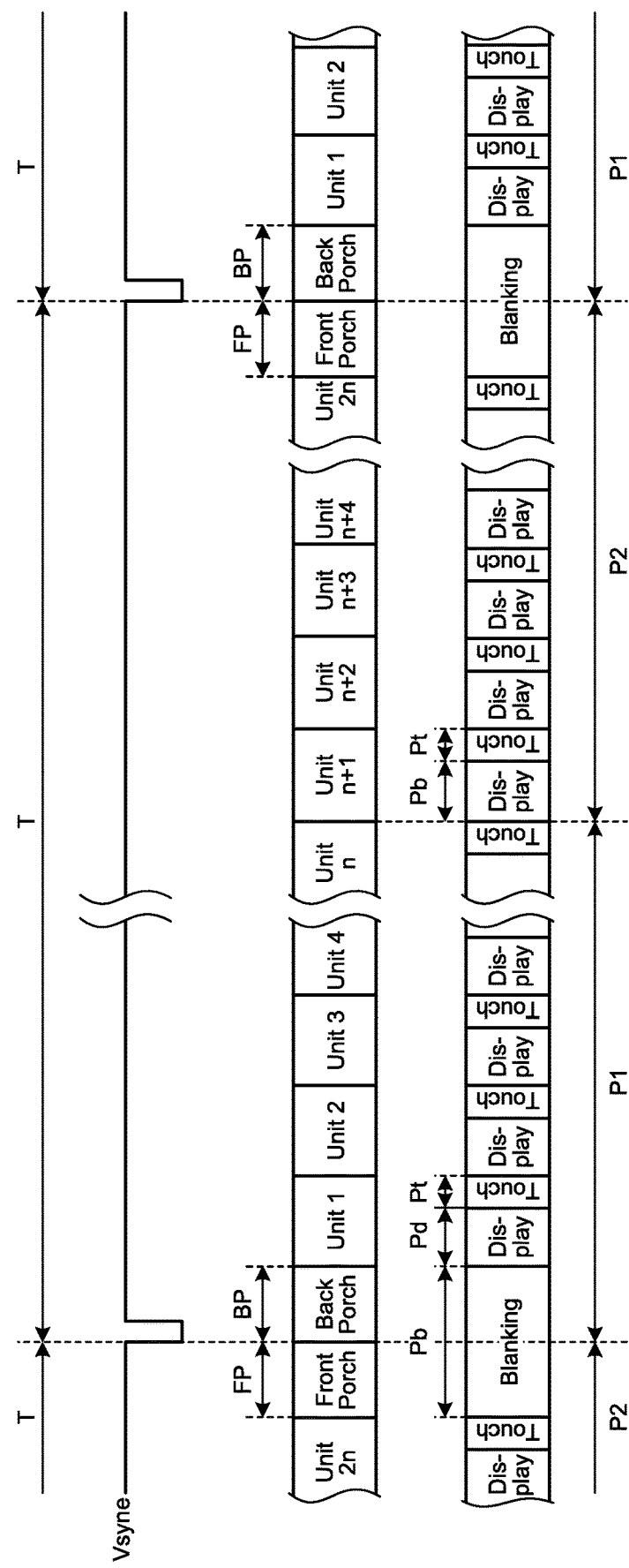
FIG. 7 is a diagram for explaining arrangement of display periods and touch detection periods according to the present embodiment.

FIG. 7 is a diagram for explaining arrangement of display periods and touch detection periods according to the present embodiment. In a frame period (vertical synchronization time) T, the controller 11 drives the lines of one frame, that is, all the scanning lines GCL, thereby causing the display functional layer to perform a display operation for an image of one frame. In other words, the controller 11 updates an image displayed by the sub-pixels SPix of one frame in one frame period T. The controller 11 also performs touch detection on one detection surface a plurality of times in one frame period T. The controller 11 causes the display operation and the touch detection operation to be performed in a time-division manner.

As illustrated in FIG. 7, if a vertical synchronization signal Vsync generated by the controller 11 is input to the gate driver 12 and the drive electrode driver 14, a back porch period BP elapses, and then the display operations and the touch detection operations are alternately performed. In other words, in the frame period T, display periods Pd and touch detection periods Pt are alternately repeated after the back porch period BP. One display period Pd and one touch detection period Pt constitute one unit period. In one frame period T, the unit periods are repeated 2n times, a front porch period FP elapses, and then the frame period T ends. If one frame period T ends, the next vertical synchronization signal Vsync is input, thereby starting the next frame period T. In other words, the controller 11 repeats the frame periods T including the back porch period BP, 2n times of unit periods, and the front porch period FP in this order, thereby performing the display operations and the touch detection operations. The back porch period BP and the front porch period FP are periods for performing neither the display operation nor the touch detection operation. The back porch period BP and the front porch period FP are periods for adjustment for the display operation, such as preparation for polarity inversion, an arithmetic operation for internal image processing, reading data, and ejection in the gate driver. In the following description, a set of the back porch period BP and the front porch period FP is referred to as a blank period Pb. In other words, the blank period Pb is a period for performing neither the display operation nor the touch detection operation.

In one display period Pd, the display operation for a partial image in an image of one frame is performed. In other words, in the display period Pd, the gate driver 12 applies the scanning signals Vscan to part of the scanning lines GCL out of all the scanning lines GCL under the control of the controller 11, thereby updating a partial image of one frame. In one display period Pd, the scanning signals Vscan are applied sequentially to a predetermined number of scanning lines GCL, that is, a plurality of scanning lines GCL in this example, thereby updating the image line by line. In the next display period Pd coming after the touch detection period Pt, the scanning signals Vscan are applied sequentially to a plurality of scanning lines GCL from the scanning line GCL in the row next to the scanning line GCL to which the scanning signal Vscan has been finally applied in the previous display period Pd. The display device 1 performs the display periods Pd a plurality of times. The display device 1 thus applies the scanning signals Vscan sequentially to all the scanning lines GCL in one frame period T, thereby updating an image of one frame. As described above, the present embodiment divides the display period for updating an image of one frame into a plurality of display periods Pd. In the example illustrated in FIG. 7, one frame period T includes 2n display periods Pd, and the display device 1 updates an image of one frame in 2n display periods Pd.

Figure 8:
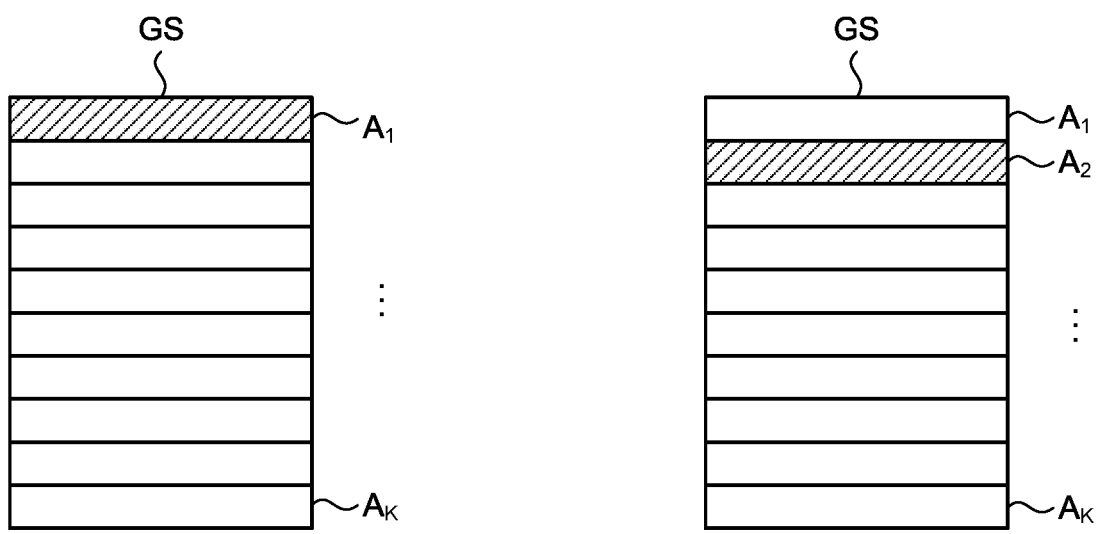
FIG. 8 is a schematic of detection blocks in the touch detection period.

FIG. 8 is a schematic of detection blocks in the touch detection period. The touch detection periods Pt are each provided between the display periods Pd. In other words, a certain touch detection period Pt is arranged after a display period Pd, and another display period Pd is arranged after the certain touch detection period Pt. In one detection period Pt, touch detection is performed on a partial region of one detection surface. In the next touch detection period Pt coming after the display period Pd, the touch detection is performed on the region on which no touch detection has been performed in the previous touch detection period Pt. In other words, as illustrated in FIG. 8, a detection surface GS of the display unit 10 on which the touch detection is performed is divided into a plurality of detection blocks Ak (k=1, 2, . . . , K). The detection blocks Ak each include a predetermined number of drive electrodes Tx. In other words, a predetermined number of drive electrodes Tx are allocated to one detection block Ak. Specifically, in a certain touch detection period Pt, the drive electrode driver 14 applies the touch drive signals Vcomt to the predetermined number of drive electrodes Tx corresponding to the detection block $A_1$ under the control of the controller 11. In the next touch detection period Pt, the drive electrode driver 14 applies the touch drive signals Vcomt to the predetermined number of drive electrodes Tx corresponding to the detection block A2. The number of drive electrodes Tx corresponding to one detection block Ak may be one or two or more. Alternatively, the number of drive electrodes Tx may vary depending on the detection blocks Ak. As described above, the drive electrode driver 14 applies the touch drive signals Vcomt to the predetermined number of drive electrodes Tx. In each of the touch detection periods Pt, the drive electrode driver 14 sequentially applies the touch drive signals Vcomt to the detection block Ak (k=1, 2, . . . , K), thereby performing touch detection on the entire detection surface GS. The detection surface GS may be the same region as the display region Ad on which images are displayed.

In one frame period T, the present embodiment performs touch detection on the entire detection surface GS a plurality of times, that is, twice in this example. In other words, as illustrated in FIG. 7, one frame period T includes a first period P1 and a second period P2 coming after the first period P1. The first period P1 includes the back porch period BP and n unit periods (the display periods Pd and the touch detection periods Pt). In the first period P1, the back porch period BP serving as the blank period Pb is arranged before the display periods Pd and the touch detection periods Pt.

The n display periods Pd of the first period P1 constitute a first display period. In the first display period, the scanning signals Vscan are applied to part of the scanning lines GCL out of all the scanning lines GCL, thereby performing the display operation for a partial image in an image of one frame. In the display periods Pd of the first display period, the display operation is sequentially performed for a further partial image of the image for which the display operation is performed in the first display period. The n touch detection periods Pt of the first period P1 constitute a first touch detection period. In the first touch detection period, the touch detection operation is performed on the entire detection surface GS. In other words, in each of the touch detection periods Pt of the first touch detection period, touch detection is performed on each detection block Ak. As a result, the touch detection operation is performed on the entire detection surface GS in the entire first touch detection period. In other words, in the first period P1, the first display period is divided into a plurality of display periods Pd, and the first touch detection period is divided into a plurality of touch detection periods Pt. In the first period P1, the display operation and the touch detection operation are performed such that the display periods Pd and the touch detection periods Pt are alternately arranged. As described above, in the first period P1, the display periods Pd and the touch detection periods Pt are alternately repeated after the back porch period BP. As a result, the display device 1 performs the display operation for a partial image in the image of one frame and the touch detection operation on the entire detection surface GS.

The second period P2 includes a total of n unit periods (the display periods Pd and the touch detection periods Pt) from n+1 to 2n and the front porch period FP. In the second period P2, the front porch time FP serving as the blank period Pb is arranged after the display periods Pd and the touch detection periods Pt.

The n display periods Pd of the second period P2 constitute a second display period. In the second display period, the display operation is performed for another partial image in the image of one frame. Specifically, in the second display period, the display operation is performed for an image other than the region on which the display operation has been performed in the first period P1 in the image of one frame. In other words, in the second display period, the scanning signals Vscan are applied to the scanning lines GCL to which no scanning signal Vscan is applied in the first period P1 out of all the scanning lines GCL. The present embodiment performs the display operation for an image of all the regions on which no display operation is performed in the first period P1 in the image of one frame. In the display periods Pd of the second display period, the display operation is sequentially performed for a further partial image of the image for which the display operation is performed in the second display period. The n touch detection periods Pt of the second period P2 constitute a second touch detection period. In the second touch detection period, the touch detection operation is performed on the entire detection surface GS. In other words, in each of the touch detection periods Pt of the second touch detection period, touch detection is performed on each detection block Ak. As a result, the touch detection operation is performed on the entire detection surface GS in the entire second touch detection period. As described above, after the first period P1, the display periods Pd and the touch detection periods Pt are alternately repeated in the second period P2. As a result, the display operation is performed for the other partial image in the image of one frame, and the touch detection operation is performed on the entire detection surface GS. Subsequently, the front porch period FP elapses, and the second period P2 ends. In other words, in the second period P2, the second display period is divided into a plurality of display periods Pd, and the second touch detection period is divided into a plurality of touch detection periods Pt. In the second period P2, the display operations and the touch detection operations are performed such that the display periods Pd and the touch detection periods Pt are alternately arranged.

The number of unit periods in the second period P2, that is, the number of display periods Pd and touch detection periods Pt is n, which is the same as the first period P1. In other words, the number of display periods Pd and touch detection periods Pt in the first period P1 is substantially equal to that in the second period P2. Alternatively, the number of display periods Pd and touch detection periods Pt in the first period P1 may be different from that in the second period P2. While one frame period T according to the present embodiment includes two periods of the first period P1 and the second period P2, the number of periods simply needs to be plural and is not limited to two. The number of periods may be three or more. In this case, a predetermined number of intermediate periods serving as another period are provided between the first period P1 serving as the first period and the second period P2 serving as the last period. Also in the intermediate period, the display periods Pd and the touch detection periods Pt are alternately arranged. In the entire display periods Pd, the display operation is performed for part of the image of one frame. In the entire touch detection period Pt, the touch detection operation is performed on the entire detection surface GS. The image of one frame is updated in the first period P1, the intermediate period, and the second period P2 as a whole. The intermediate period does not include the back porch period BP.

Figure 9:
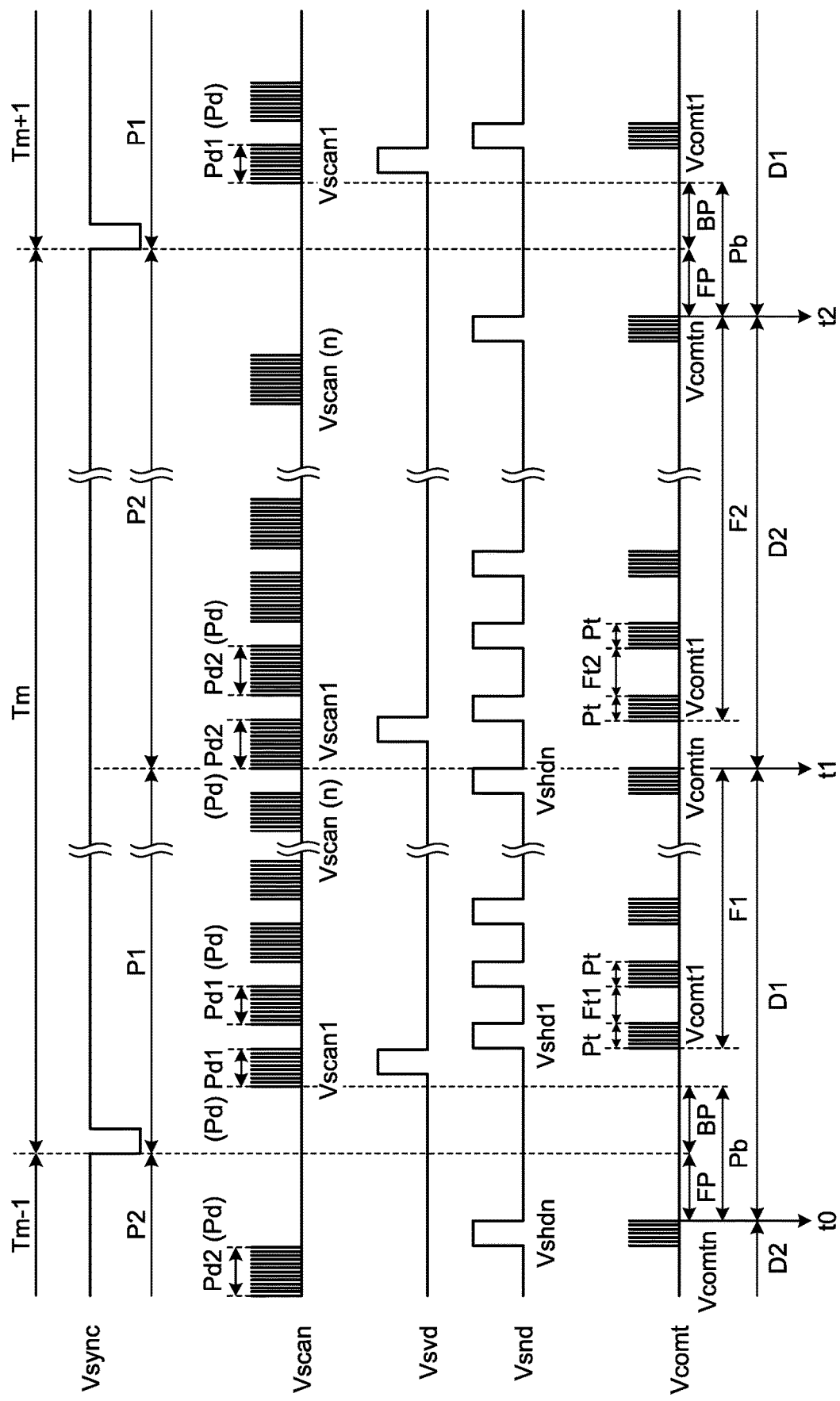
FIG. 9 is a time chart of signal output according to the present embodiment.

The following describes the display operation and the touch detection operation in the frame period T according to the present embodiment in greater detail. FIG. 9 is a time chart of signal output according to the present embodiment. The time chart in FIG. 9 illustrates the state of application of the vertical synchronization signals Vsync, the scanning signals Vscan, the touch detection synchronization signals Vsvd, touch drive start signals Vshd, and the touch drive signals Vcomt per unit time. The vertical synchronization signals Vsync are generated by the controller 11 as described above and output in each frame period T by the controller 11. The scanning signals Vscan are generated by the gate driver 12 under the control of the controller 11 and sequentially output to the scanning lines GCL by the gate driver 12 in the display period Pd as described above. The touch detection synchronization signals Vsvd are generated and output to the drive electrode driver 14 by the controller 11 as described above. The touch detection synchronization signal Vsvd acts as a trigger for generating the touch drive start signal Vshd. The touch drive start signals Vshd are generated and output by the drive electrode driver 14 based on the touch detection synchronization signals Vsvd. The touch drive start signal Vshd indicates a timing and a period for outputting the touch drive signals Vcomt. The period in which the touch drive start signal Vshd is generated corresponds to the touch detection period Pt. In other words, the drive electrode driver 14 outputs the touch drive signals Vcomt to the drive electrodes Tx in the period when the touch drive start signal Vshd is generated. In the example according to the present embodiment, a plurality of drive electrodes Tx are allocated to one detection block Ak. As a result, the touch drive signals Vcomt are applied to a plurality of drive electrodes Tx in one touch detection period Pt.

As illustrated in FIG. 9, in a frame period Tm, the first period P1 starts when the vertical synchronization signal Vsync is output. In the first period P1, the back porch period BP starts first. After the back porch period BP elapses, the first display period Pd starts. In the first display period Pd, the scanning signals Vscan (scanning signals Vscan1) are sequentially applied to the scanning lines GCL. In the first period P1, the touch detection synchronization signal Vsvd is output from the middle of the first display period Pd to the timing when the first display period Pd ends. The touch detection synchronization signal Vsvd in the first period P1 is output using the first display period Pd in the first period P1, that is, output of the first scanning signals Vscan as a trigger. The touch detection synchronization signal Vsvd in the first period P1 is output when a predetermined time has elapsed since the first display period Pd started, for example.

At the timing when output of the touch detection synchronization signal Vsvd is finished in the first period P1, that is, at the timing when the first display period Pd ends, the first touch drive start signal Vshd (touch drive start signal Vshd1) is output. In other words, the first touch drive start signal Vshd is output using the touch detection synchronization signal Vsvd as a trigger. The touch drive start signal Vshd is output during the touch detection period Pt. In other words, while the touch drive start signal Vshd is being output, the touch drive signals Vcomt (touch drive signals Vcomt1) are output to the respective drive electrodes Tx of one detection block Ak.

Subsequently in the first period P1, the scanning signals Vscan and the touch drive start signals Vshd, that is, the scanning signals Vscan and the touch drive signals Vcomt are alternately output. In other words, the next scanning signals Vscan are output during the display period Pd from the timing when output of the touch drive start signal Vshd is finished. The next touch drive start signal Vshd and the next touch drive signals Vcomt are output during the touch detection period Pt from the timing when output of the scanning signals Vscan is finished, that is, the timing when the display period Pd ends. As described above, after the back porch period BP in the first period P1, the display periods Pd and the touch detection periods Pt are alternately repeated. In the first period P1, the display operation is performed for one partial image in an image of one frame from the first display period Pd to the last display period Pd. The touch detection operation is performed on the entire detection surface GS from the first touch detection period Pt to the last touch detection period Pt.

If output of the last touch drive start signal Vshd (touch drive start signal Vshdn) is finished in the first period P1, that is, if output of the last touch drive signals Vcomt (touch drive signals Vcomtn) is finished in the first period P1, the touch detector 40 outputs the coordinates calculated by the coordinate extractor 45, that is, information on the coordinates of the position where a touch is detected as the detection signal output Vout. The touch detector 40 outputs the detection signal output Vout to the controller 11, for example.

If the last touch drive signals Vcomt are output in the first period P1, and if output of the coordinates of the position where a touch is detected is finished, the first period P1 ends, and the second period P2 starts. No blank period Pb is provided between the first period P1 and the second period P2. Consequently, immediately after the output of the coordinates of the position where a touch is detected is finished in the first period P1, the second period P2 starts, and the first display period Pd in the second period P2 starts. In the first display period Pd in the second period P2, the scanning signals Vscan (scanning signals Vscan1) are sequentially applied to the scanning lines GCL. The touch detection synchronization signal Vsvd is output from the middle of the first display period Pd to the timing when the first display period Pd ends. The touch detection synchronization signal Vsvd in the second period P2 is output using the last touch drive signals Vcomt in the first period P1 as a trigger, for example. Specifically, the touch detection synchronization signal Vsvd in the second period P2 is output when a predetermined time has elapsed since the last touch drive signals Vcomt in the first period P1 was output. Alternatively, the touch detection synchronization signal Vsvd in the second period P2 may be output using the first display period Pd in the second period P2, that is, output of the first scanning signals Vscan as a trigger.

At the timing when output of the touch detection synchronization signal Vsvd is finished, that is, at the timing when the first display period Pd ends, the first touch drive start signal Vshd (touch drive start signal Vshd1) is output. The touch drive start signal Vshd is output during the touch detection period Pt. In other words, while the touch drive start signal Vshd is being output, the touch drive signals Vcomt (touch drive signals Vcomt1) are output to the respective drive electrodes Tx of one detection block Ak.

Subsequently in the second period P2, the scanning signals Vscan and the touch drive start signals Vshd, that is, the scanning signals Vscan and the touch drive signals Vcomt are alternately output in the same manner as the first period P1. As described above, the display periods Pd and the touch detection periods Pt are alternately repeated also in the second period P2. In the second period P2, the display operation is performed for the other partial image in the image of one frame from the first display period Pd to the last display period Pd. The touch detection operation is performed on the entire detection surface GS from the first touch detection period Pt to the last touch detection period Pt.

If output of the last touch drive start signal Vshd (touch drive start signal Vshdn) is finished in the second period P2, that is, if output of the last touch drive signals Vcomt (touch drive signals Vcomtn) is finished in the second period P2, the touch detector 40 outputs the coordinates calculated by the coordinate extractor 45, that is, information on the coordinates of the position where a touch is detected as the detection signal output Vout.

If the last touch drive signals Vcomt are output in the second period P2, and if output of the coordinates of the position where a touch is detected is finished, the front porch period FP starts. If the front porch period FP ends, the second period P2 ends, and the first period P1 of the next frame period $T_{m+1}$ starts.

Figure 10:
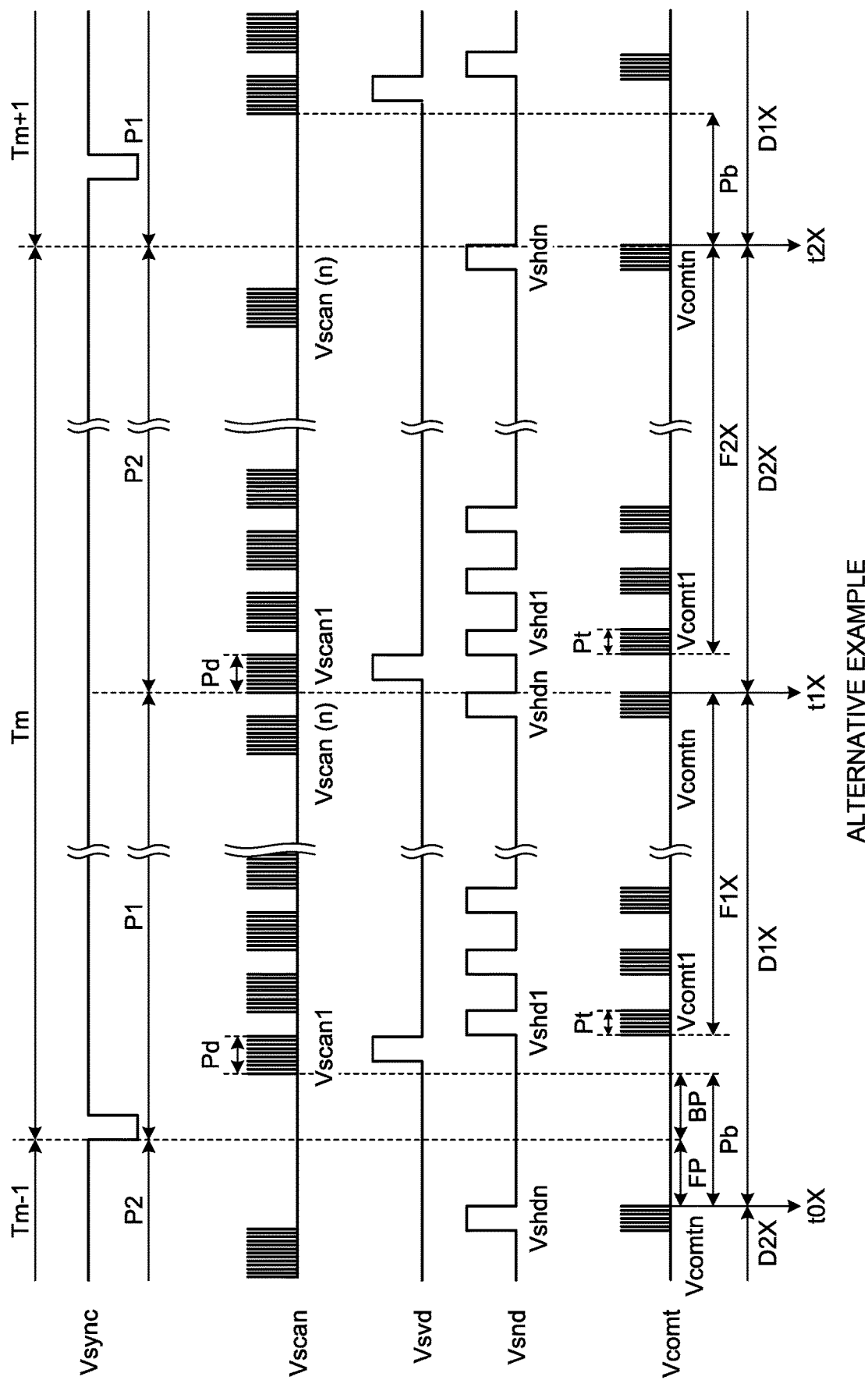
FIG. 10 is a time chart of signal output according to an alternative example.

Before a detailed explanation of the display operation and the touch detection operation according to the present embodiment, an alternative example is described below. FIG. 10 is a time chart of signal output according to an alternative example. As described above, the coordinates where a touch is detected are output after the last touch drive signals Vcomt are output. Consequently, as illustrated in FIG. 10, the alternative example outputs the coordinates where a touch is detected in the second period P2 of a frame period $T_{m-1}$ at time t0X corresponding to a timing immediately after the last touch drive signals Vcomtn are output in the second period P2 of the frame period $T_{m-1}$. The alternative example outputs the coordinates where a touch is detected in the first period P1 of the frame period Tm at time t1X corresponding to a timing immediately after the last touch drive signals Vcomtn are output in the first period P1 of the frame period Tm. The alternative example outputs the coordinates where a touch is detected in the second period P2 of the frame period Tm at time t2X corresponding to a timing immediately after the last touch drive signals Vcomtn are output in the second period P2 of the frame period Tm. In other words, a first report time D1X is from when the coordinates of a detected touch are output in the second period P2 of the frame period $T_{m-1}$ to when the coordinates of a detected touch are output in the first period P1 of the frame period Tm, and the first report time D1X corresponds to a time from the time t0X to the time t1X. A second report time D2X is from when the coordinates of a detected touch are output in the first period P1 of the frame period Tm to when the coordinates of a detected touch are output in the second period P2 of the frame period Tm, and the second report time D2X corresponds to a time from the time t1X to the time t2X.

The period from the end of the second period P2 to the beginning of the first period P1 is the blank period Pb for performing neither the display operation nor the touch detection operation. Consequently, the first report time D1X from the time t0X to the time t1X includes the blank period Pb, that is, the front porch period FP of the frame period $T_{m-1}$ and the back porch period BP of the frame period Tm. By contrast, the second report time D2X includes no blank period Pb. As a result, the first report time D1X according to the alternative example is longer than the second report time D2X by the blank period Pb. If the length of the first report time D1X is different from that of the second report time D2X, the timing of the display device 1 performing an operation reflecting the result of touch detection varies depending on the report times. As a result, the accuracy of touch detection may possibly deteriorate. If a circle is drawn on the display device 1 at a constant speed, for example, the timings of outputting the coordinates are uneven between the first report time D1X and the second report time D2X. As a result, the circle may possibly be distorted.

To address this, as illustrated in FIG. 9, the display device 1 according to the present embodiment adjusts the display periods Pd of the first period P1 and the display periods Pd of the second period P2, thereby reducing the difference between the length of a first report time D1 and that of a second report time D2. The first report time D1 according to the present embodiment is a time from time t0 to time t1, and the second report time D2 is a time from the time t1 to time t2. The time t0 is a timing for outputting the coordinates where a touch is detected in the second period P2 of the frame period $T_{m-1}$. The time t1 is a timing for outputting the coordinates where a touch is detected in the first period P1 of the frame period Tm. The time t2 is a timing for outputting the coordinates where a touch is detected in the second period P2 of the frame period Tm. The present embodiment preferably makes the length of the first report time D1 substantially equal to that of the second report time D2.

Specifically, the display device 1 according to the present embodiment makes the length of a time F1 from the first touch detection period Pt to the last touch detection period Pt in the first period P1 different from the length of a time F2 from the first touch detection period Pt to the last touch detection period Pt in the second period P2. More specifically, the display device 1 makes the time F1 shorter than the time F2. In the alternative embodiment illustrated in FIG. 10, the first report time D1X is longer by the brank period Pb because the time F1X is substantially equal to the time F2X. By contrast, the present embodiment absorbs the length of the blank period Pb by making the time F1 shorter, thereby reducing the difference between the length of the first report time D1X and that of the second report time D2. The present embodiment preferably makes the difference between the time F2 and the time F1 substantially equal to the length of the blank period Pb. As a result, the present embodiment can make the length of the first report time D1 substantially equal to that of the second report time D2, thereby improving the touch detection accuracy more appropriately. The time F1 according to the present embodiment corresponds to a time from the timing when the first touch drive signals Vcomt1 (or the touch drive start signal Vshd1) are output in the first period P1 to the timing when output of the last touch drive signals Vcomtn (or the touch drive start signal Vshdn) is finished in the first period P1. The time F2 corresponds to a time from the timing when the first touch drive signals Vcomt1 (or the touch drive start signal Vshd1) are output in the second period P2 to the timing when output of the last touch drive signals Vcomtn (or the touch drive start signal Vshdn) is finished in the second period P2.

The present embodiment makes the length of the touch detection period Pt substantially equal between the time F1 and the time F2, that is, between the first period P1 and the second period P2. Furthermore, the present embodiment makes the number of display periods Pd and touch detection periods Pt substantially equal between the time F1 and the time F2, that is, between the first period P1 and the second period P2. To make the time F1 and the time F2 different, the display device 1 makes the length of the display period Pd different between the time F1 and the time F2, that is, between the first period P1 and the second period P2. The display period (display period in the time F1) Pd in the first period P1 is referred to as a display periods Pd1, and the display period (display period in the time F2) Pd in the second period P2 is referred to as a display periods Pd2. In this case, the display device 1 makes the length of the display period Pd1 in the first period P1 different from that of the display period Pd2 in the second period P2. More specifically, the display device 1 makes the length of the display period Pd1 in the first period P1 shorter than that of the display period Pd2 in the second period P2. In other words, the display device 1 makes a time Ft1 from a certain touch detection period Pt in the first period P1 to the touch detection period Pt coming immediately after the certain touch detection period Pt different from a time Ft2 from a certain touch detection period Pt in the second period P2 to the touch detection period Pt coming immediately after the certain touch detection period Pt. More specifically, the display device 1 makes the time Ft1 shorter than the time Ft2. The time Ft1 is a time from when the certain touch detection period Pt in the first period P1 ends to when the touch detection period Pt coming immediately after the certain touch detection period Pt starts. The time Ft2 is a time from when the certain touch detection period Pt in the second period P2 ends to when the touch detection period Pt coming immediately after the certain touch detection period Pt starts. The time Ft1 corresponds to the display period Pd1, and the time Ft2 corresponds to the display period Pd2.

As described above, the display device 1 according to the present embodiment makes the length of the display period Pd1 in the first period P1 shorter than that of the display period Pd2 in the second period P2, that is, makes the time Ft1 shorter than the time Ft2. The display device 1 thus can make the time F1 shorter than the time F2 with the touch detection periods Pt remaining substantially equal.

To make the length of the display period Pd1 in the first period P1 shorter than that of the display period Pd2 in the second period P2, the display device 1 according to the present embodiment makes the number of scanning lines GCL to which the scanning signals Vscan are applied in the first period P1, that is, the number of scanning lines GCL driven in the first period P1 smaller than the number of scanning lines GCL driven in the second period P2. More specifically, the present embodiment makes the number of scanning lines GCL to which the scanning signals Vscan are applied in the display period Pd1 smaller than the number of scanning lines GCL to which the scanning signals Vscan are applied in the display period Pd2. Let us assume a case where the total number of scanning lines GCL of one frame is 1140, for example. In this case, the alternative example, for example, applies the scanning signals Vscan to 15 scanning lines GCL in one display period Pd and has 38 display periods Pd and 38 touch detection periods Pt in both the first period P1 and the second period P2. In this case, the alternative example applies the scanning signals Vscan to 570 scanning lines GCL in both the first period P1 and the second period P2. As a result, the alternative example applies the scanning signals Vscan to 1140 scanning lines GCL in total in one frame period T. While the present embodiment also has 38 display periods Pd and 38 touch detection periods Pt in both the first period P1 and the second period P2, the present embodiment applies the scanning signals Vscan to 14 scanning lines GCL in the display period Pd1 of the first period P1 and to 16 scanning lines GCL in the display period Pd2 of the second period P2. In this case, the present embodiment applies the scanning signals Vscan to 532 scanning lines GCL in the first period P1 and to 608 scanning lines GCL in the second period P2. As a result, in one frame period T, the present embodiment applies the scanning signals Vscan to 1140 scanning lines GCL in total, that is, the scanning lines GCL of one frame. As described above, the present embodiment makes the number of scanning lines GCL to which the scanning signals Vscan are applied different between the display period Pd1 and the display period Pd2 with the number of scanning lines GCL to which the scanning signals Vscan are applied in one frame period T remaining the number of one frame. Consequently, the present embodiment can appropriately perform the display operation and improve the touch detection accuracy.

If the time of all the display periods Pd in the first period P1 is defined as the first display period, and the time of all the display periods Pd in the second period P2 is defined as the second display period as described above, the display device 1 makes the length of the first display period different from that of the second display period. More specifically, the display device 1 makes the length of the first display period shorter than that of the second display period. If the time of all the touch detection periods Pt in the first period P1 is defined as the first touch detection period, and the time of all the touch detection periods Pt in the second period P2 is defined as the second touch detection period as described above, the display device 1 preferably makes the length of the first touch detection period substantially equal to that of the second touch detection period. As a result, the first period P1 is made shorter than the second period P2.

As described above, the display device 1 according to the present embodiment includes the drive electrodes (first electrodes) Tx, the pixel electrodes (second electrodes) 22, the display functional layer (liquid crystal layer 6 in this example), the touch detection electrodes Rx, and the controller 11. The drive electrodes Tx are supplied with the display drive signals Vcomd. The pixel electrodes 22 are supplied with the pixel signals Vpix. The display functional layer performs a display operation based on the display drive signals Vcomd and the pixel signals Vpix. The touch detection electrodes Rx output the touch detection signals Vdet and perform a touch detection operation. The controller 11 controls the display operation and the touch detection operation. The controller 11 controls the display operation and the touch detection operation such that the frame period T for performing the display operation for an image of one frame is divided into the first period P1 and the second period P2. The first period P1 includes the first display period, the first touch detection period, and the blank period Pb. The first display period is a period for performing the display opera-tion for a partial image in the image of one frame. The first touch detection period is a period for performing touch detection on one detection surface GS. The blank period Pb is a period coming before the first display period and the first touch detection period and for performing neither the display operation nor the touch detection operation. The second period P2 includes the second display period and the second touch detection period. The second display period is a period for performing the display operation for another partial image in the image of one frame. The second touch detection period is a period for performing touch detection on one detection surface GS. The controller 11 makes the length of the first display period different from that of the second display period.

If touch detection on the detection surface GS is performed in both the first period P1 and the second period P2 like the present embodiment, the blank period Pb is included in the first report time D1 corresponding to the time from when the coordinates of a detected touch is output in the second period P2 to when the coordinates of a detected touch is output in the next first period P1. By contrast, no blank period Pb is included in the second report time D2 corresponding to the time from when the coordinates of a detected touch is output in the first period P1 to when the coordinates of a detected touch is output in the next second period P2. As a result, the length of the first report time D1 is different from that of the second report time D2, thereby deteriorating the touch detection accuracy. To address this, the controller 11 according to the present embodiment makes the length of the first display period in the first period P1 different from that of the second display period in the second period P2. Consequently, the present embodiment can reduce the difference between the length of the first report time D1 and that of the second report time D2, thereby improving the touch detection accuracy. The controller 11 adjusts the lengths of the first report time D1 and the second report time D2 by adjusting the display periods. Consequently, the present embodiment need not adjust the touch detection time and can improve the touch detection accuracy more appropriately.

In the first period P1, the controller 11 divides the first display period into a plurality of display periods Pd and divides the first touch detection period into a plurality of touch detection periods Pt. The controller 11 causes the display operation and the touch detection operation to be performed such that the display periods Pd and the touch detection periods Pt are alternately arranged. In the second period P2, the controller 11 divides the second display period into a plurality of display periods Pd and divides the second touch detection period into a plurality of touch detection periods Pt. The controller 11 causes the display operation and the touch detection operation to be performed such that the display periods Pd and the touch detection periods Pt are alternately arranged. The controller 11 makes the time F1 from the first touch detection period Pt to the last touch detection period Pt in the first period P1 different from the time F2 from the first touch detection period Pt to the last touch detection period Pt in the second period P2. The display device 1 makes the time F1 different from the time F2 in division driving of performing the display period and the touch detection period in a division manner. Consequently, the display device 1 can reduce the difference between the length of the first report time D1 and that of the second report time D2, thereby improving the touch detection accuracy.

The controller 11 makes the time F1 from the first touch detection period Pt to the last touch detection period Pt in the first period P1 shorter than the time F2 from the first touch detection period Pt to the last touch detection period Pt in the second period P2. By making the time F1 shorter than the time F2, the display device 1 can prevent the first report time D1 from being much longer than the second report time D2, thereby improving the touch detection accuracy.

The controller 11 makes the time Ft1 from a certain touch detection period Pt to the touch detection period Pt coming immediately after the certain touch detection period Pt in the first period P1 shorter than the time Ft2 from a certain touch detection period Pt to the touch detection period Pt coming immediately after the certain touch detection period Pt in the second period P2. The display device 1 makes the cycle of each touch detection period Pt in the first period P1 shorter than that of each touch detection period Pt in the second period P2. Consequently, the display device 1 can prevent the first report time D1 from being much longer than the second report time D2, thereby improving the touch detection accuracy.

The controller 11 makes the number of scanning lines GCL driven to perform the display operation in the first period P1 smaller than the number of scanning lines GCL driven to perform the display operation in the second period P2. Consequently, the display device 1 can prevent the first report time D1 from being much longer than the second report time D2, thereby improving the touch detection accuracy.

The controller 11 causes the display operation and the touch detection operation to be performed in a manner repeating the frame period T including the first period P1 and the second period P2. The controller 11 makes the length of the first report time D1 substantially equal to that of the second report time D2. The first report time D1 corresponds to the time from when the coordinates of the position where a touch is detected in the second period P2 is output to when the coordinates of the position where a touch is detected in the first period P1 of the next frame period T is output. The second report time D2 corresponds to the time from when the coordinates of the position where a touch is detected in the first period P1 is output to when the coordinates of the position where a touch is detected in the second period P2 is output. By making the length of the first report time D1 substantially equal to that of the second report time D2, the display device 1 can improve the touch detection accuracy.

While the display device 1 according to the present embodiment performs touch detection on the entire detection surface GS twice in one frame period T, it may perform touch detection on the entire detection surface GS three times or more in one frame period T. In other words, one frame period T may include the first period P1, the second period P2, and a third period P3 and periods coming after the third period P3. In this case, the display device 1 makes the third period P3 and the periods coming after the third period P3 similar to the second period P2. In other words, the display device 1 makes the time F1 from the first touch detection period Pt to the last touch detection period Pt in the first period P1 shorter than the time F2 from the first touch detection period Pt to the last touch detection period Pt in the second period P2 and than a time from the first touch detection period Pt to the last touch detection period Pt in the third period P3 and the periods coming after the third period P3.

The display device 1 performs touch detection based on the mutual capacitance between the drive electrodes Tx and the touch detection electrodes Rx. The display device 1 can improve the touch detection accuracy in a mutual capacitance display device.

Figure 11:
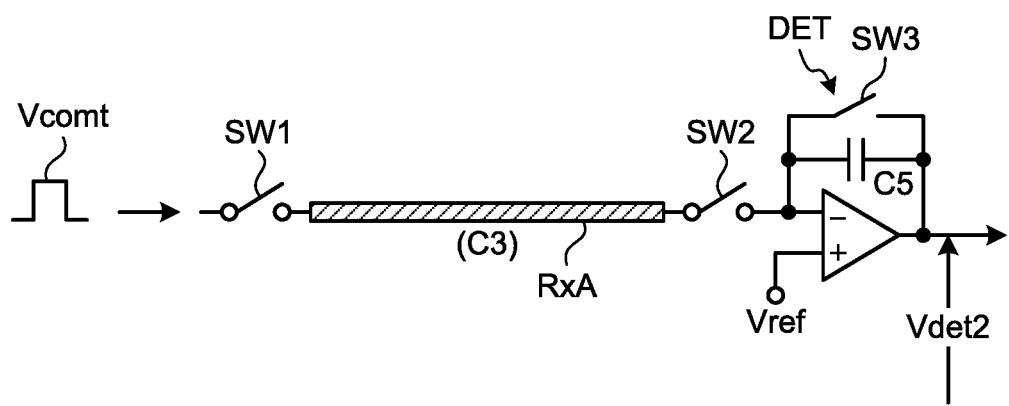
FIG. 11 is a diagram for explaining a basic principle of self-capacitance touch detection and illustrates a state where a finger is neither in contact with nor in proximity to a touch detection electrode.
Figure 12:
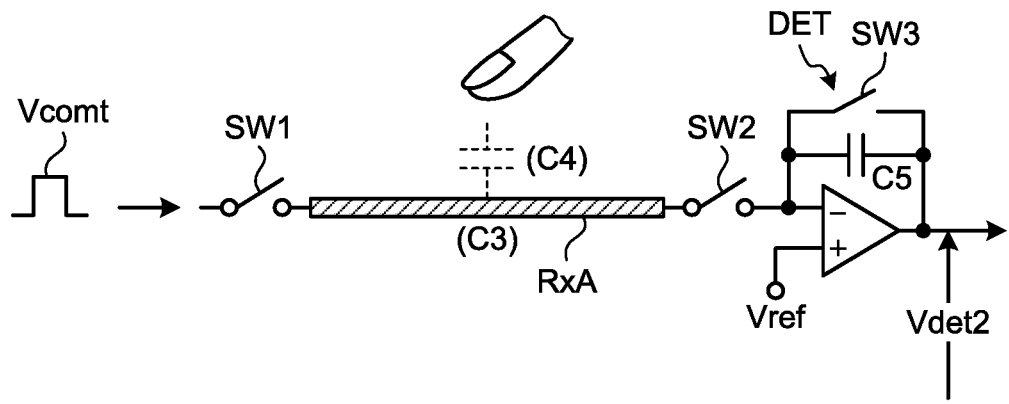
FIG. 12 is a diagram for explaining the basic principle of self-capacitance touch detection and illustrates a state where a finger is in contact with or in proximity to the touch detection electrode.
Figure 13:
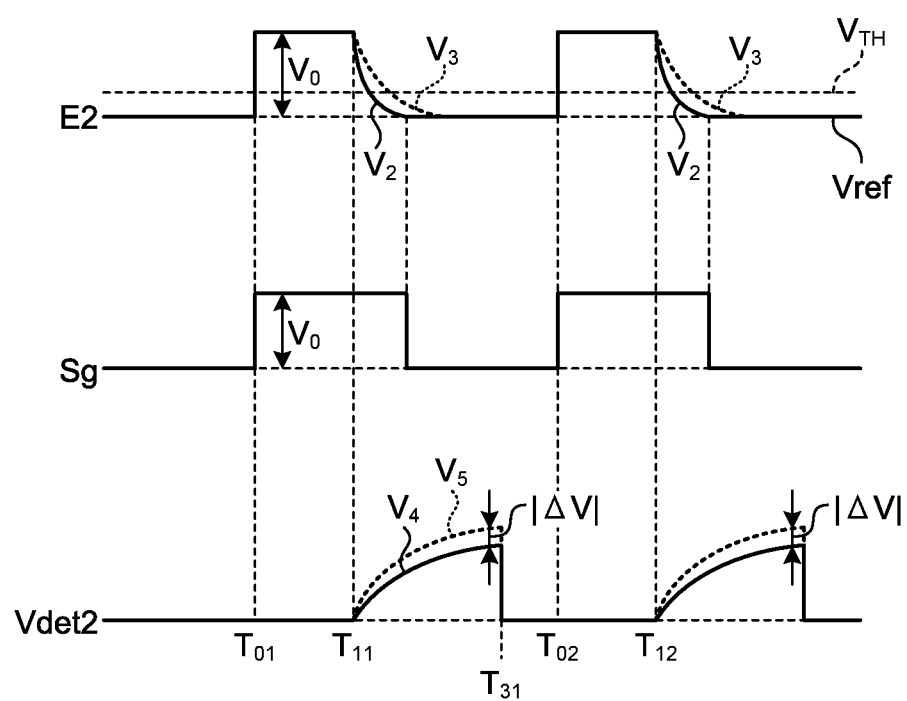
FIG. 13 is a diagram of an example of waveforms of a drive signal and a touch detection signal.

While the touch panel 30 according to the present embodiment is a mutual capacitance touch sensor, it may be a self-capacitance touch sensor. In other words, the display device 1 may perform touch detection based on the self-capacitance of touch detection electrodes RxA. The following describes a basic principle of self-capacitance touch detection with reference to FIGS. 11 to 13. FIG. 11 is a diagram for explaining the basic principle of self-capacitance touch detection and illustrates a state where a finger is neither in contact with nor in proximity to a touch detection electrode. FIG. 12 is a diagram for explaining the basic principle of self-capacitance touch detection and illustrates a state where a finger is in contact with or in proximity to the touch detection electrode. FIG. 13 is a diagram of an example of waveforms of a drive signal and a touch detection signal. FIGS. 11 and 12 also illustrate a detection circuit.

As illustrated in FIG. 11, when a finger is neither in contact with nor in proximity to the touch detection electrode RxA, the touch drive signal Vcomt serving as an AC rectangular wave at a predetermined frequency (e.g., a frequency of the order of several kilohertz to several hundred kilohertz) is applied to the touch detection electrode RxA. The touch detection electrode RxA has capacitance C3, and an electric current depending on the capacitance C3 flows. The voltage detector DET converts fluctuations in the electric current depending on an AC rectangular wave Sg into fluctuations in the voltage (waveform $V_4$ indicated by the solid line (refer to FIG. 13)).

As illustrated in FIG. 12, when a finger is in contact with or in proximity to the touch detection electrode RxA, capacitance C4 between the finger and the detected touch is added to the capacitance C3 of the touch detection electrode RxA. When the touch drive signal Vcomt is applied to the touch detection electrode RxA, an electric current depending on the capacitance C3 and C4 flows. As illustrated in FIG. 13, the voltage detector DET converts fluctuations in the electric current depending on the touch drive signal Vcomt into fluctuations in the voltage (waveform $V_5$ indicated by the dotted line). By integrating the voltage values of the waveforms $V_4$ and $V_5$ and comparing these values, it can be determined whether a finger is in contact with or in proximity to the touch detection electrode RxA. The touch detector 40 does not necessarily employ the method described above and may compare the voltage values without integrating them. Alternatively, the touch detector 40 may calculate respective periods for a waveform $V_2$ and a waveform $V_3$ to decrease to a predetermined reference voltage in FIG. 13 and compare these periods, for example.

Specifically, as illustrated in FIGS. 11 and 12, the touch detection electrode RxA can be separated by a switch SW1 and a switch SW2. In FIG. 13, the touch drive signal Vcomt raises the voltage level by an amount corresponding to voltage $V_0$ at time $T_{01}$. At this time, the switch SW1 is turned on, and the switch SW2 is turned off. As a result, the voltage in the touch detection electrode RxA is also raised by voltage $V_0$. Subsequently, the switch SW1 is turned off before time $T_{11}$. While the touch detection electrode RxA is in a floating state at this time, the electric potential of the touch detection electrode RxA is maintained at $V_0$ by the capacitance C3 (refer to FIG. 11) of the touch detection electrode or capacitance (C3+C4, refer to FIG. 12) obtained by adding the capacitance C4 generated by contact or proximity of a finger or the like to the capacitance C3 of the touch detection electrode. Subsequently, a switch SW3 is turned on before time $T_{11}$ and is turned off after a predetermined time has elapsed, thereby resetting the voltage detector DET. This reset operation makes the output voltage substantially equal to Vref.

Subsequently, when the switch SW2 is turned on at time $T_{11}$, the voltage in an inversion input unit of the voltage detector DET increases to the voltage $V_0$ substantially equal to that of the touch detection electrode RxA. Subsequently, the voltage in the inversion input unit of the voltage detector DET decreases to the reference voltage Vref based on a time constant of the capacitance C3 (or C3+C4) of the touch detection electrode RxA and capacitance C5 in the voltage detector DET. At this time, the electric charges accumulated in the capacitance C3 (or C3+C4) of the touch detection electrode RxA move to the capacitance C5 in the voltage detector DET, whereby output from the voltage detector DET increases (Vdet2). When a finger or the like is not in proximity to the touch detection electrode RxA, the output (Vdet2) from the voltage detector DET is represented by the waveform $V_4$ indicated by the solid line, and Vdet2=C3·$V_0$/C5 is satisfied. When capacitance generated by the effect of a finger or the like is added, the output is represented by the waveform $V_5$ indicated by the dotted line, and Vdet2=(C3+C4)·$V_0$/C5 is satisfied. Subsequently, at time T31 after the electric charges in the capacitance C3 (or C3+C4) of the touch detection electrode RxA sufficiently move to the capacitance C5, the switch SW2 is turned off, and the switch SW1 and the switch SW3 are turned on. As a result, the electric potential of the touch detection electrode RxA decreases to a low level substantially equal to that of the AC rectangular wave Sg, and the voltage detector DET is reset. The timing to turn on the switch SW1 may be any timing as long as it is after the turning off of the switch SW2 and before time $T_{02}$. The timing to reset the voltage detector DET may be any timing as long as it is after the turning off of the switch SW2 and before time $T_{12}$. The operation described above is repeated at a predetermined frequency (e.g., a frequency of the order of several kilohertz to several hundred kilohertz). Based on the absolute value |ΔV| of the difference between the waveform $V_4$ and the waveform $V_5$, it can be determined whether an external proximity object is present (whether a touch is made). As illustrated in FIG. 13, when a finger or the like is not in proximity to the touch detection electrode RxA, the electric potential of the touch detection electrode RxA is represented by a waveform $V_2$. When the capacitance C4 generated by the effect of a finger or the like is added, the electric potential is represented by a waveform $V_3$. It may be determined whether an external proximity object is present (whether a touch is made) by measuring a time for the waveform $V_2$ and the waveform $V_3$ to decrease to a predetermined voltage $V_{TH}$. To employ the self-capacitance system, the touch panel 30 simply needs to have a configuration that enables touch detection by the drive electrodes and does not necessarily have the circuit configuration described above.

Figure 14:
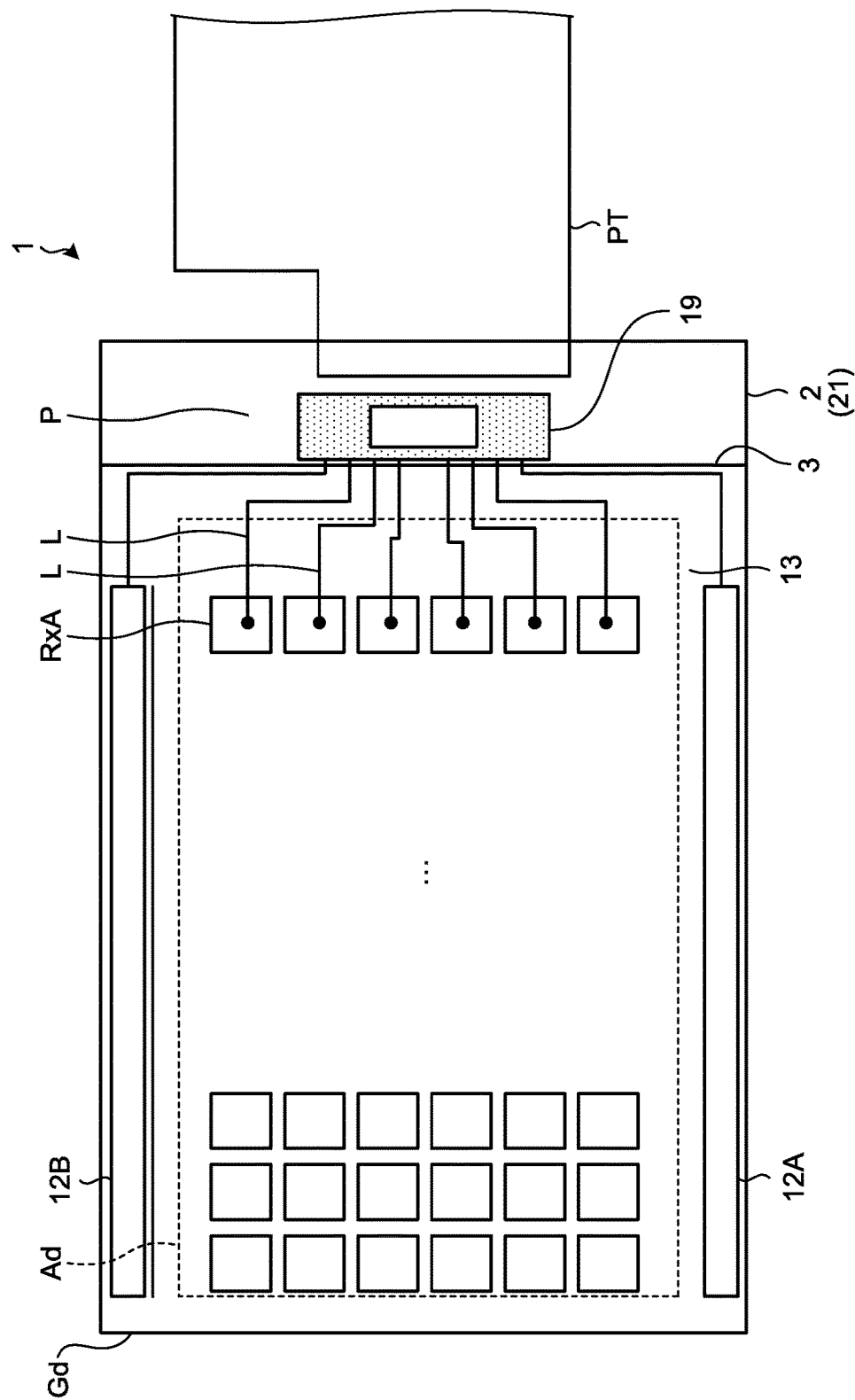
FIG. 14 is a schematic of another example of the module provided with the display device.

FIG. 14 is a schematic of another example of the module provided with the display device. If the display device 1 employs the self-capacitance system, it may use touch detection electrodes RxA provided in a matrix (row-column configuration) as electrodes having both of the functions of the touch detection electrodes Rx and the drive electrodes Tx. In this case, the COG 19 incorporates the functions of the touch detector 40, and the touch detection electrodes RxA are coupled to the COG 19 via wires L. While part of the touch detection electrodes RxA are coupled to the COG 19 via the respective wires L in FIG. 14 for convenience of the explanation, all the touch detection electrodes RxA are coupled to the COG 19 via the respective wires L in the actual configuration. The shape and the size of the touch detection electrode RxA may be optionally determined, and the size may correspond to the size of a pixel, for example. In this case, one of the electrodes constituting a pixel (e.g., the pixel electrode 22 in a pixel of the liquid crystal display device or the drive electrode Tx serving as a counter electrode) may be used as the touch detection electrode RxA. In other words, the touch detection electrodes RxA may be also used as electrodes provided to respective pixels of the display device including the pixels. In this case, the touch detection electrodes Rx need not be provided. In the self-capacitance system, a plurality of touch detection electrodes RxA disposed side by side in one line may serve as the detection block Ak (refer to FIG. 8). Alternatively, one touch detection electrode RxA may serve as the detection block Ak.

First Modification

The following describes a first modification of the present embodiment. The first modification is different from the embodiment described above in the time chart of signal output. Explanation of the components of the first modification common to the embodiment above is omitted below.

Figure 15:
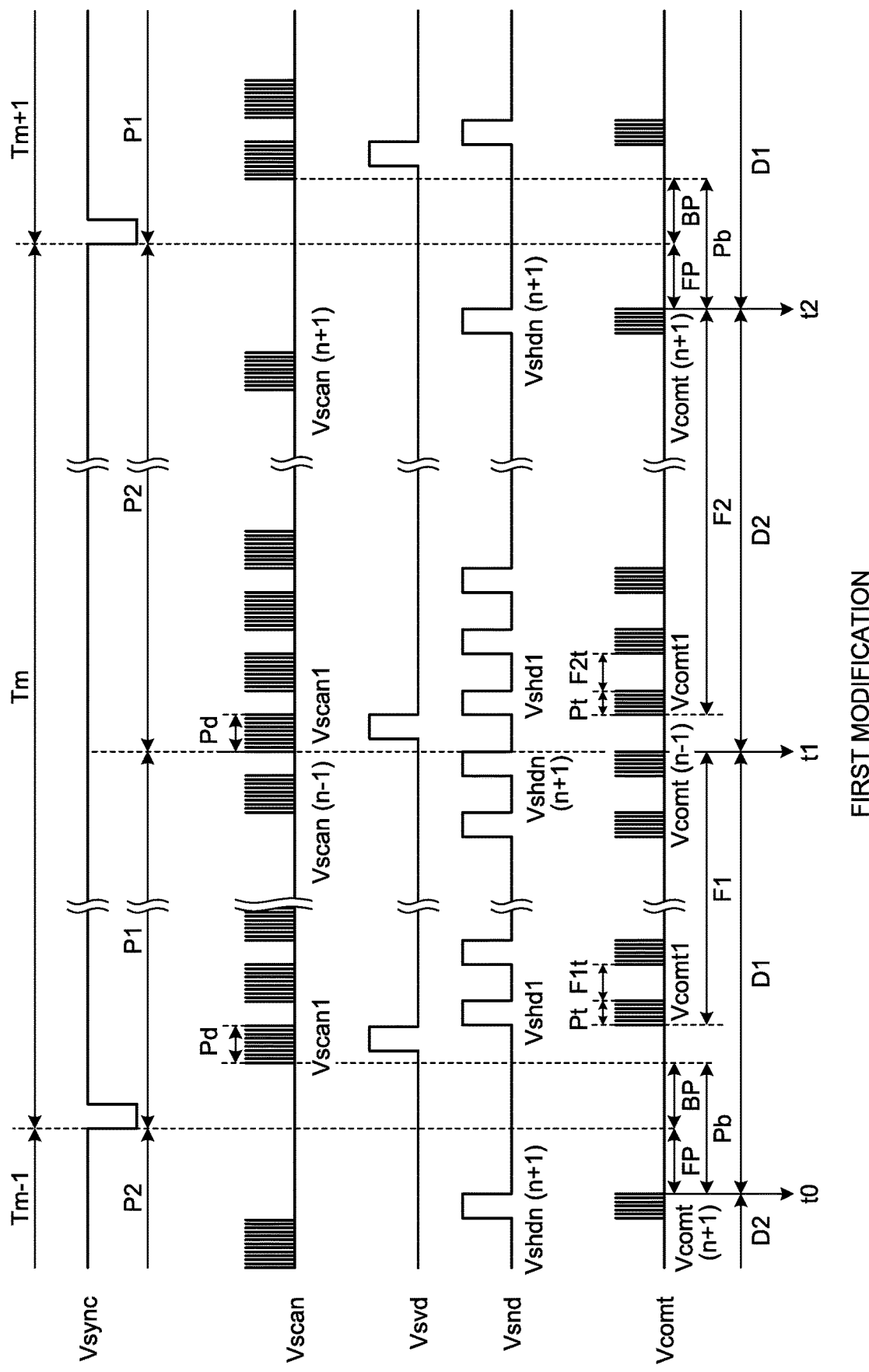
FIG. 15 is a time chart of signal output according to a first modification.

FIG. 15 is a time chart of signal output according to the first modification. In the same manner as the embodiment above, the first modification makes the length of the time F1 from the first touch detection period Pt to the last touch detection period Pt in the first period P1 shorter than the length of the time F2 from the first touch detection period Pt to the last touch detection period Pt in the second period P2. The first modification thus reduces the difference between the length of the first report time D1 and that of the second report time D2. The first modification is different from the embodiment above in that the numbers of scanning lines GCL driven in one display period Pd are substantially equal in the first period P1 and the second period P2. Consequently, in the first modification, the length of the display period Pd in the first period P1 is substantially equal to that of the display period Pd in the second period P2.

The first modification makes the number of display periods Pd in the first period P1 smaller than the number of display periods Pd in the second period P2. In the example illustrated in FIG. 15, the number of display periods Pd in the first period P1 is (n−1), and the number of display periods Pd in the second period P2 is (n+1). The first modification thus makes the length of the time F1 shorter than that of the time F2. More specifically, the first modification makes a first display time corresponding to the total time of the display periods Pd in the first period P1 shorter than a second display time corresponding to the total time of the display periods Pd in the second period P2. In the example illustrated in FIG. 15, the display periods Pd and the touch detection periods Pt are alternately arranged. Consequently, the first modification also makes the number of touch detection periods Pt in the first period P1 smaller than the number of touch detection periods Pt in the second period P2 in addition to making the number of display periods Pd in the first period P1 smaller than the number of display periods Pd in the second period P2. The numbers of touch detection periods Pt may be substantially equal.

As described above, in the first modification, the controller 11 makes the number of display periods Pd in the first period P1 smaller than the number of display periods Pd in the second period P2. Consequently, the first modification can reduce the difference between the length of the first report time D1 and that of the second report time D2, thereby improving the touch detection accuracy.

Second Modification

The following describes a second modification. The second modification is different from the embodiment described above in the time chart of signal output. Explanation of the components of the second modification common to the embodiment above is omitted below.

Figure 16:
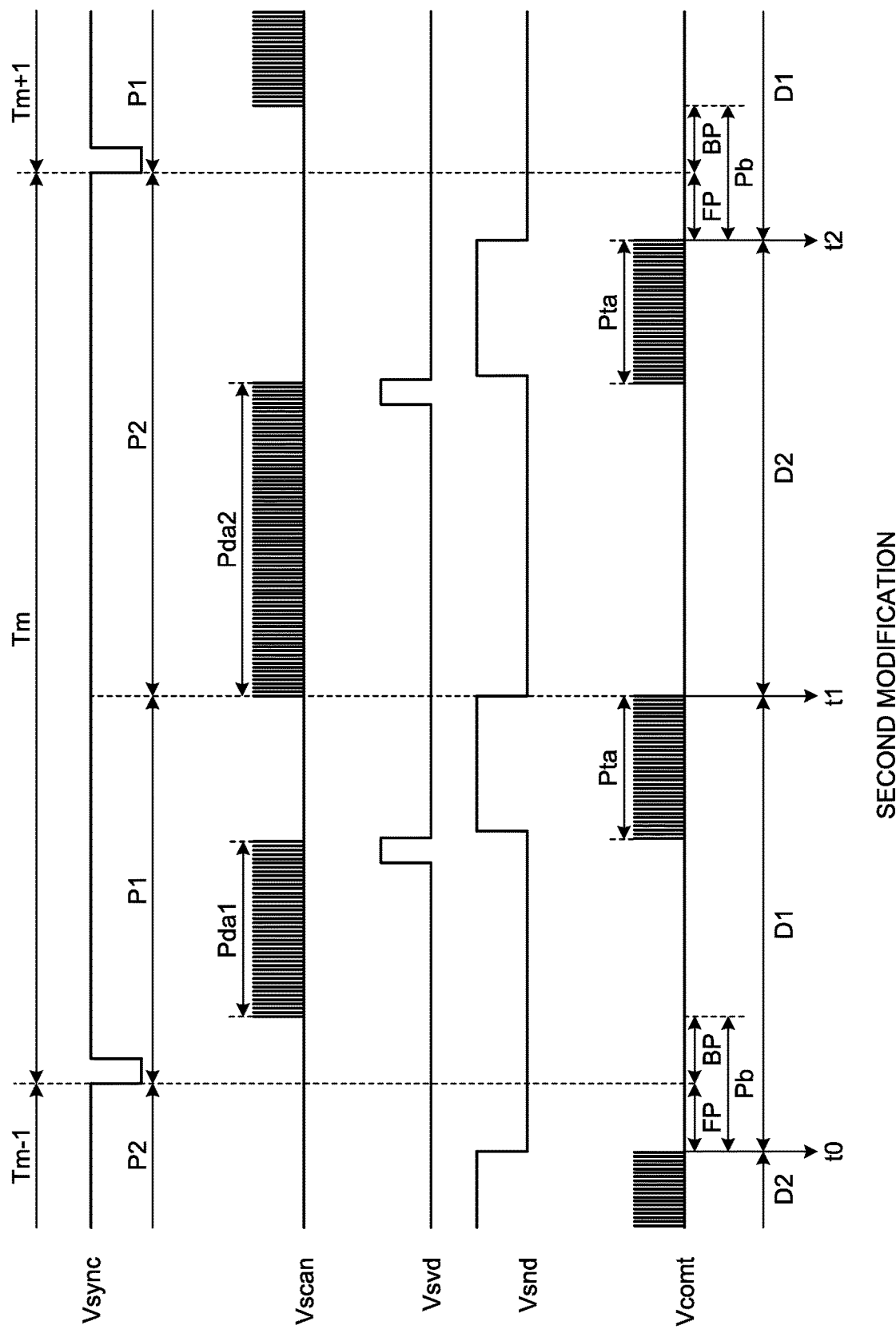
FIG. 16 is a time chart of signal output according to a second modification.

FIG. 16 is a time chart of signal output according to the second modification. As illustrated in FIG. 16, a first display period Pda1 corresponding to the entire display period in the first period P1 according to the second modification is not divided into a plurality of display periods Pd and serves as one continuous period. In the same manner, a first touch detection period Pta1 corresponding to the entire touch detection period in the first period P1 is not divided into a plurality of touch detection periods Pt and serves as one continuous period. Also in the second period P2, a second display period Pda2 and a second touch detection period Pta2 are not divided and serve as one continuous period.

In the first period P1, the first display period Pda1 is arranged after the back porch period BP. In the first display period Pda1, the display operation is performed for one partial image of one frame. The first touch detection period Pta1 is arranged immediately after the first display period Pda1. In the first touch detection period Pta1, the touch detection operation is performed on one detection surface GS. If output of the coordinates is finished in the first touch detection period Pta1, the second period P2 starts. In the second period P2, the second display period Pda2 is arranged first. In the second display period Pda2, the display operation is performed for the other partial image of one frame. The second touch detection period Pta2 is arranged immediately after the second display period Pda2. In the second touch detection period Pta2, the touch detection operation is performed on one detection surface GS. If output of the coordinates is finished in the second touch detection period Pta2, the front porch period FP starts. If the front porch period FP ends, the second period P2 ends, and the next frame period T starts.

The second modification makes the length of the first display period Pda1 different from that of the second display period Pda2. More specifically, the second modification makes the length of the first display period Pda1 shorter than that of the second display period Pda2. The second modification thus reduces the difference between the length of the first report time D1 and that of the second report time D2. The second modification preferably makes the length of the first touch detection period Pta1 substantially equal to that of the second touch detection period Pta2. If division driving is not performed like the second modification, the touch detection accuracy can be improved by making the length of the first display period Pda1 different from that of the second display period Pda2. Also in the first and second modifications, one frame period T may include the first period P1, the second period P2, and the third period P3 and periods coming after the third period P3 in the same manner as the embodiment described above.

Out of other advantageous effects provided by the aspects described in the present embodiment, advantageous effects clearly defined by the description in the present specification or appropriately conceivable by those skilled in the art are naturally provided by the present disclosure.

What is claimed is:

1. A display device comprising:
  a plurality of pixel electrodes supplied with a pixel signal and a display functional layer configured to perform a display operation based on the pixel signal;
  a plurality of touch detection electrodes configured to output a touch detection signal and perform a touch detection operation; and
  a controller configured to control the display operation and the touch detection operation, wherein
  the controller causes the display operation and the touch detection operation to be performed such that a frame period is divided into a first period and a second period, the first period including a first display period for performing the display operation for a partial image in an image of one frame, a first touch detection period for performing touch detection on one detection surface, and a blank period coming before the first display period and the first touch detection period and for performing neither the display operation nor the touch detection operation, the second period including a second display period for performing the display operation for another partial image in the image of one frame and a second touch detection period for performing touch detection on one detection surface, and
  the controller makes the length of the first display period different from the length of the second display period, wherein
  the controller causes the display operation and the touch detection operation to be performed in a manner repeating the frame period including the first period and the second period, and
  the controller makes the length of a first report time substantially equal to the length of a second report time, the first report time corresponding to a time from when coordinates of a position where a touch is detected in the second period is output to when coordinates of a position where a touch is detected in the first period of the next frame period is output, the second report time corresponding to a time from when the coordinates of the position where the touch is detected in the first period is output to when coordinates of a position where a touch is detected in the second period is output.

2. The display device according to claim 1, wherein the controller divides the first display period into a plurality of display periods and divides the first touch detection period into a plurality of touch detection periods in the first period and causes the display operation and the touch detection operation to be performed such that the display periods and the touch detection periods are alternately arranged,
  the controller divides the second display period into a plurality of display periods and divides the second touch detection period into a plurality of touch detection periods in the second period and causes the display operation and the touch detection operation to be performed such that the display periods and the touch detection periods are alternately arranged, and
  the controller makes a time from the first one of the touch detection periods to the last one of the touch detection periods in the first period different from a time from the first one of the touch detection periods to the last one of the touch detection periods in the second period.

3. The display device according to claim 2, wherein the controller makes the time from the first one of the touch detection periods to the last one of the touch detection periods in the first period shorter than the time from the first one of the touch detection periods to the last one of the touch detection periods in the second period.

4. The display device according to claim 3, wherein the controller makes a time from a certain touch detection period to the touch detection period coming immediately after the certain touch detection period in the first period shorter than a time from a certain touch detection period to the touch detection period coming immediately after the certain touch detection period in the second period.

5. The display device according to claim 3, wherein the controller makes number of the display periods in the first period smaller than number of the display periods in the second period.

6. The display device according to claim 2, wherein the controller makes number of scanning lines driven to perform the display operation in the first period smaller than number of scanning lines driven to perform the display operation in the second period.

7. The display device according to claim 1, wherein the touch detection is performed based on mutual capacitance between a drive electrode supplied with a display drive signal and the touch detection electrodes.

8. The display device according to claim 1, wherein the touch detection is performed based on self-capacitance of the touch detection electrodes.

9. A display method performed by a display device including a plurality of pixel electrodes supplied with a pixel signal, a display functional layer configured to perform a display operation based on the pixel signal, and a plurality of touch detection electrodes configured to output a touch detection signal and perform a touch detection operation, the display method comprising:
  causing the display operation and the touch detection operation to be performed such that a frame period is divided into a first period and a second period, the first period including a first display period for performing the display operation for a partial image in an image of one frame, a first touch detection period for performing touch detection on one detection surface, and a blank period coming before the first display period and the first touch detection period and for performing neither the display operation nor the touch detection operation, the second period including a second display period for performing the display operation for another partial image in the image of one frame and a second touch detection period for performing touch detection on one detection surface; and
  making the length of the first display period different from the length of the second display period, wherein
  the causing includes causing the display operation and the touch detection operation to be performed in a manner repeating the frame period including the first period and the second period, and
  the causing makes the length of a first report time substantially equal to the length of a second report time, the first report time corresponding to a time from when coordinates of a position where a touch is detected in the second period is output to when coordinates of a position where a touch is detected in the first period of the next frame period is output, the second report time corresponding to a time from when the coordinates of the position where the touch is detected in the first period is output to when coordinates of a position where a touch is detected in the second period is output.

10. A display device comprising:
  a plurality of pixel electrodes supplied with a pixel signal and a display functional layer configured to perform a display operation based on the pixel signal; and
  a plurality of touch detection electrodes configured to output a touch detection signal and perform a touch detection operation, wherein
  the display device is configured to control the display operation and the touch detection operation, wherein
  the display device causes the display operation and the touch detection operation to be performed such that a frame period is divided into a first period and a second period, the first period including a first display period for performing the display operation for a partial image in an image of one frame, a first touch detection period for performing touch detection on one detection surface, and a blank period coming before the first display period and the first touch detection period and for performing neither the display operation nor the touch detection operation, the second period including a second display period for performing the display operation for another partial image in the image of one frame and a second touch detection period for performing touch detection on one detection surface, and
  the display device makes the length of the first display period different from the length of the second display period, wherein
  the display device causes the display operation and the touch detection operation to be performed in a manner repeating the frame period including the first period and the second period, and
  the display device makes the length of a first report time substantially equal to the length of a second report time, the first report time corresponding to a time from when coordinates of a position where a touch is detected in the second period is output to when coordinates of a position where a touch is detected in the first period of the next frame period is output, the second report time corresponding to a time from when the coordinates of the position where the touch is detected in the first period is output to when coordinates of a position where a touch is detected in the second period is output, the first period and the second period being equal.

11. The display device according to claim 10, wherein the display device divides the first display period into a plurality of display periods and divides the first touch detection period into a plurality of touch detection periods in the first period and causes the display operation and the touch detection operation to be performed such that the display periods and the touch detection periods are alternately arranged,
  the display device divides the second display period into a plurality of display periods and divides the second touch detection period into a plurality of touch detection periods in the second period and causes the display operation and the touch detection operation to be performed such that the display periods and the touch detection periods are alternately arranged, and
  the display device makes a time from the first one of the touch detection periods to the last one of the touch detection periods in the first period different from a time from the first one of the touch detection periods to the last one of the touch detection periods in the second period.

12. The display device according to claim 11, wherein the display device makes the time from the first one of the touch detection periods to the last one of the touch detection periods in the first period shorter than the time from the first one of the touch detection periods to the last one of the touch detection periods in the second period.

13. The display device according to claim 12, wherein the display device makes a time from a certain touch detection period to the touch detection period coming immediately after the certain touch detection period in the first period shorter than a time from a certain touch detection period to the touch detection period coming immediately after the certain touch detection period in the second period.

14. The display device according to claim 12, wherein the display device makes number of the display periods in the first period smaller than number of the display periods in the second period.

15. The display device according to claim 11, wherein the display device makes number of scanning lines driven to perform the display operation in the first period smaller than number of scanning lines driven to perform the display operation in the second period.

16. The display device according to claim 10, wherein the touch detection is performed based on mutual capacitance between a drive electrode supplied with a display drive signal and the touch detection electrodes.

17. The display device according to claim 10, wherein the touch detection is performed based on self-capacitance of the touch detection electrodes.

* * * * *